United States Patent
Stemmer et al.

(10) Patent No.: US 6,703,240 B1
(45) Date of Patent: Mar. 9, 2004

(54) MODIFIED STARCH METABOLISM ENZYMES AND ENCODING GENES FOR IMPROVEMENT AND OPTIMIZATION OF PLANT PHENOTYPES

(75) Inventors: Willem P. C. Stemmer, Los Gatos, CA (US); Venkitswaran Subramanian, San Diego, CA (US); Sun Ai Raillard, Mountain View, CA (US); Gjalt Huisman, San Carlos, CA (US)

(73) Assignee: Maxygar, Inc., Redwood City, CA (US)

( * ) Notice: Subject to any disclaimer, the term of this patent is extended or adjusted under 35 U.S.C. 154(b) by 0 days.

(21) Appl. No.: 09/547,844

(22) Filed: Apr. 12, 2000

Related U.S. Application Data
(60) Provisional application No. 60/129,009, filed on Apr. 13, 1999.

(51) Int. Cl.[7] .................. C12N 15/00; C07H 21/02; C07H 21/04; C12H 1/68; C12P 19/34
(52) U.S. Cl. .................. 435/440; 435/6; 435/91.2; 536/23.1; 536/24.3
(58) Field of Search ................ 536/23.1, 24.3; 435/7.1, 7.3, 6, 440, 91.2

(56) References Cited

U.S. PATENT DOCUMENTS

| | | | |
|---|---|---|---|
| 5,723,323 A | 3/1998 | Kauffman et al. | |
| 5,750,875 A | 5/1998 | Stalker et al. | |
| 5,756,316 A | 5/1998 | Schellenberger | |
| 5,763,192 A | 6/1998 | Kauffman et al. | |
| 5,783,431 A | 7/1998 | Peterson et al. | |
| 5,814,476 A | 9/1998 | Kauffman et al. | |
| 5,817,483 A | 10/1998 | Kauffman et al. | |
| 5,824,485 A | 10/1998 | Thompson et al. | |
| 5,824,514 A | 10/1998 | Kauffman et al. | |
| 5,824,790 A | 10/1998 | Keeling et al. | |

FOREIGN PATENT DOCUMENTS

| | | |
|---|---|---|
| WO | WO 95/22625 | 8/1995 |
| WO | WO 96/33207 | 10/1996 |
| WO | WO 98/42727 | 10/1998 |
| WO | WO 99/20768 | 4/1999 |
| WO | WO 00/28018 | 5/2000 |

OTHER PUBLICATIONS

Iglesias A et al. *J. Biol Chem* 268: 1081–1086.
Kossmann et al. (1991) *Mol Gen Genet* 230:39.
Bhattacharyya et al (1990) *Cell* 60: 115.
Botstein and Shortle, *Science* (1985) 229:1193.
Buleon et al. (1998) *Int. J. Biological Macromolecules* 23: 85–112.
Carter (1986) *Biochem J* 237:1–7.
Carter (1987) *Methods in Enzymol* 154:382–403.
Carter et al. (1985) *Nucl Acids Res* 13:4431–4443.
Chang et al. (1999) "Evolution of a cytokine using DNA family shuffling" *Nature Biotechnology* 17:793–797.
Christians et al. (1999) "Directed evolution of thymidine kinase for AZT phosphorylation using DNA family shuffling" *Nature Biotechnology* 17:259–264.
Crameri and Stemmer (1995) "Combinational multiple cassette mutagenesis creates all the permutations of mutant and wildtype cassettes" *BioTechniques* 18:194–196.
Crameri et al. (1996) "Construction and evolution of antibody–phage libraries by DNA shuffling" *Nature Medicine* 2:100–102.
Crameri et al. (1996) "Improved green fluorescent protein by molecular evolution using DNA shuffling" *Nature Biotechnology* 14:315–319.
Crameri et al. (1997) "Molecular evolution of an arsenate detoxification pathway by DNA shuffling," *Nature Biotechnology* 15:436–438.
Crameri et al. (1998) "DNA shuffling of an family of genes from diverse species accelerates directed evolution" *Nature* 391:288–291.
Damotte et al. (1968) *BBRC* 32: 916–920.
Daniell et al. (1998) *Nature Biotechnology* 16: 346–348.
O'Neill et al. (1993) The Plant Journal 3: 729.
Eghtedarzadeh and Henikoff (1986) *Nucl Acids Res* 14:5115.
Fritz et al. (1988) *Nucl Acids Res* 16:6987–6999.
Gates et al. (1996) "Affinity selective isolation of ligands from peptide libraries through display on a lac repressor 'headpiece dimer'" *Journal of Molecular Biology* 255:373–386.
Grundström et al. (1985) *Nucl Acids Res* 13:3305–3315.
Guan et al. (1993) *Plant Physiol.* 102: 1269.
Kramer and Fritz (1987) *Methods in Enzymol* 154:350–367.
Kramer et al. (1984) *Cell* 38:879–887.
Kramer et al. (1984) *Nucl Acids Res* 12:9441–9456.
Kramer et al. (1998) *Nucl Acids Res* 16:7207.
Kunkel (1985) *Proc Natl Acad Sci USA* 82:488–492.
Kunkel (1987) "The efficiency of oligonucleotide directed mutagenesis" in *Nucleic acids & Molecular Biology*, Eckstein and Lilley (eds.) Springer Verlag, Berlin 124–135.
Kunkel et al. *Methods in Enzymol* 154:367–382.
Maliga P (1993) *TIBTECH* 11: 101–107.
Minshull and Stemmer (1999) "Protein evolution by molecular breeding" *Current Opinion in Chemical Biology* 3:284–290.

(List continued on next page.)

Primary Examiner—Deborah J. Reynolds
Assistant Examiner—Joseph Woitach
(74) *Attorney, Agent, or Firm*—Christopher Holmer; Norman J. Kruse; Townsend & Townsend & Crew

(57) ABSTRACT

The invention provides methods for generating, identifying, and selecting polynucleotides encoding novel starch metabolizing enzymes (NSME), NSME-encoding polynucleotides, compositions of recombinant shuffled NSME protein, plant cells and microbes containing a shuffled NSME polynucleotide in expressible form, plants containing a shuffled NSME polynucleotide in expressible form, novel starch compositions produced by plants and cells, uses of such plants, cells, and starch compositions.

82 Claims, 3 Drawing Sheets

OTHER PUBLICATIONS

Nakamaye and Eckstein (1986) *Nucl Acids Res* 14:9679–9698.

Nakamura et al. (1998) *Plant Physiol. 118*: 451–459.

Nambiar et al. (1984) *Science* 223:1299–1301.

Ness et al. (1999) "DNA Shuffling of subgenomic sequences of subtilisin" *Nature Biotechnology* 17:893–896.

Ostermeier et al. (1999) "A combinatorial approach to hybrid enzymes independent of DNA homology" *Nature Biotech* 17:1205–1209.

Patten et al. (1997) "Applications of DNA Shuffling to Pharmaceuticals and Vaccines" *Current Opinion in Biotechnology* 8:724–733.

Preiss J, (1996) *BIotechnology Annual Review* vol. 2, pp259–279.

Romeo et al. (1993) *J. Bact. 175*: 4744–4754.

Sakamar and Khorana (1988) *Nucl Acids Res* 14:6361–6371.

Sayers et al. (1988) *Nucl Acids Res* 16:791–801.

Sayers et al. (1988) *Nucl Acids Res* 16:803–813.

Smith (1985) *Ann Rev Genet* 19: 423–462.

Stemmer (1994) "DNA Shuffling by random fragmentation and reassembly: In vitro recombination for molecular evolution." *Proceedings of the National Academy of Sciences, U.S.A.* 91:10747–10751.

Stemmer (1994)"Rapid evolution of a protein in vitro by DNA shuffling" *Nature* 370:389–391.

Stemmer (1995) "Searching Sequence Space" *Bio/Technology* 13:549–553.

Stemmer (1995) "The Evolution of Molecular Computation" *Science* 270: 1510.

Stemmer (1996) "Sexual PCR and Assembly PCR" In: *The Encyclopedia of Molecular Biology*. VCH Publishers, New York. pp. 447–457.

Stemmer et al., (1995) "Single–step assembly of a gene and entire plasmid form large numbers of oligodeoxyribonucleotides" *Gene*, 164:49–53.

Stemmer et al., (1999) "Molecular breeding od viruses for targeting and other clinical properties". *Tumor Targeting* 4:1–4.

Sun et al. (1998) *Plant Physiol 118*:37–49.

Swinkels JJM (1985) *Starch 1*: 1–5.

Taylor et al. (1985) *Nucl Acids Res* 13:8765–8785.

Taylor et al. (1985) *Nucl Acids Res* 13:8749–8763.

Wells et al. (1985) *Gene* 34:315–323.

Wells et al. (1986) *Phil Trans R Soc Lond* 317:415–423.

Zeeman et al. (1998) *The Plant Cell 10*:1699–1711.

Zhang et al. (1997) "Directed evolution of an effective fucosidase from a galactosidase by DNA shuffling and screening" *Proceedings of the National Academy of Sciences, U.S.A.*. 94:4504–4509.

Zoller and Smith (1982) *Nucl Acids Res* 10:6487–6499 (1983).

Zoller and Smith and (1987) *Methods in Enzymol* 154:329–347.

Zoller and Smith *Methods in Enzymol* 100:468–500.

MODIFIED STARCH METABOLISM ENZYMES AND ENCODING GENES FOR IMPROVEMENT AND OPTIMIZATION OF PLANT PHENOTYPES

CROSS-REFERENCE TO RELATED APPLICATIONS

This application claims priority to and benefit of provisional application USSN 60/129,009, filed Apr. 13, 1999, pursuant to 35 USC 119 (e).

COPYRIGHT NOTICE

Pursuant to 37 C.F.R. 1.71 (e), Applicants note that a portion of this disclosure contains material which is subject to copyright protection. The copyright owner has no objection to the facsimile reproduction by anyone of the patent document or patent disclosure, as it appears in the Patent and Trademark Office patent file or records, but otherwise reserves all copyright rights whatsoever.

FIELD OF THE INVENTION

The invention relates to methods and compositions for generating, modifying, adapting, and optimizing polynucleotide sequences that encode proteins having enzyme activities involved in starch metabolism which are useful for introduction into plant species, and other hosts, and related aspects.

BACKGROUND OF THE INVENTION

Genetic engineering of agricultural organisms dates back thousands of years to the dawn of agriculture. The hand of man has selected the agricultural organisms having the phenotypic traits that were deemed desirable, e.g., taste, high yield, caloric value, ease of propagation, resistance to pests and disease, and appearance. Classical breeding methods to select for germplasm encoding desirable agricultural traits had been a standard practice of the world's farmers long before Gregor Mendel and others identified the basic rules of segregation and selection. For the most part, the fundamental process underlying the generation and selection of desired traits was the natural mutation frequency and recombination rates of the organisms, which are quite slow compared to the human lifespan and make it difficult to use conventional methods of breeding to rapidly obtain or optimize desired traits in an organism.

The recent advent of non-classical, or "recombinant" genetic engineering techniques has provided new means to expedite the generation of agricultural organisms having desired traits that provide an economic, ecological, nutritional, or aesthetic benefit. To date, most recombinant approaches have involved transferring a novel or modified gene into the germline of an organism to effect its expression or to inhibit the expression of the endogenous homologue gene in the organism's native genome. However, the currently used recombinant techniques are generally unsuited for substantially increasing the rate at which a novel or improved phenotypic trait can be evolved. Essentially all recombinant genes in use today for agriculture are obtained from the germplasm of existing plant and microbial specimens, which have naturally evolved coordinately with constraints related to other aspects of the organism's evolution and typically are not optimized for the desired phenotype(s). The sequence diversity available is limited by the natural genetic variability within the existing specimen gene pool, although crude mutagenic approaches have been used to add to the natural variability in the gene pool.

Unfortunately, the induction of mutations to generate diversity often requires chemical mutagenesis, radiation mutagenesis, tissue culture techniques, or mutagenic genetic stocks. These methods provide means for increasing genetic variability in the desired genes, but frequently produce deleterious mutations in many other genes. These other traits may be removed, in some instances, by further genetic manipulation (e.g., backcrossing), but such work is generally both expensive and time consuming. For example, in the flower business, the properties of stem strength and length, disease resistance and maintaining quality are important, but often initially compromised in the mutagenesis process.

STARCH METABOLISM IN PLANTS

The biosynthesis of starches in higher plants occurs in three steps, the first of which involves synthesis of ADP-glucose from ATP and glucose-1-phosphate and is catalyzed by ADP-glucose pyrophosphorylase ("ADPGPP"; EC 2.4.7.27). The second step of starch biosynthesis is transfer of a glucosyl moiety of ADP-glucose to a maltodextrin or starch to give rise to a new 1,4-glucosyl linkage; the reaction is catalyzed by a starch synthase ("SS"; EC 2.4.1.21), of which there are several forms present either as soluble enzymes or bound to starch particles as particulate enzymes. The third reaction is catalyzed by branching enzymes ("BE"; EC 2.4.1.18) and is responsible for synthesis of 1,6-glucosyl linkages. An exemplary starch biosynthetic pathway is illustrated in FIG. 1.

Starch metabolism is a dynamic process wherein catabolic activities antagonize the synthetic (anabolic) processes which form starch. Examples of catabolic activities include amylase (alpha and beta), two categories of debranching enzymes, isoamylases and pullulanases (limit dextrinases; R enzymes), and starch phosphorylase. The composition of starches that are produced result from the relative actions of the anabolic and catabolic activities.

The enzymatic activities of the various enzymes involved in starch metabolism control the properties and types of the starches which are present in the plant, typically in the form of storage granules. Various commercial native starches produced in a variety of plants differ dramatically in important physical, mechanical, and chemical properties, and are important for foodstuff and industrial uses (Swinkels, J.(1985) Starch 37:1). It is theoretically possible to alter the composition of starches made in a plant cell or plant storage organ by introducing heterologous or modified genes encoding enzymes that can alter starch metabolism. U.S. Pat. Nos. 5,750,875 and 5,824,790 disclose methods that reportedly modify starch metabolizing ability by introducing foreign genes into a plant genome or by suppressing endogenous gene expression. However, both of these methods are severely limited by the small pool of naturally occurring genes in various organisms that are useful for the methods. It would be highly desirable for the art to have methods for producing novel starch compositions by engineering gene sequences encoding modified starch biosynthetic enzymes, and introducing these gene sequences into plant cells, thereby creating novel plant cells that produce a desirable starch composition, particularly of types which are industrially useful and not available or obtainable only by laborious purification and chemical modification methods.

As noted, the advent of recombinant DNA technology has provided agriculturists with additional means of modifying plant genomes. While certainly practical in some areas, to date genetic engineering methods have had limited success in transferring or modifying important biosynthetic or other pathways, including certain naturally-occurring genes encoding starch metabolizing enzymes into photosynthetic organisms and bacteria. The creation of plants and other photosynthetic organisms having improved starch biosynthetic pathways can provide increased yields of certain types of starchy foodstuffs, enhanced industrial feedstocks, improved chemical compositions and clothing, and may alter the types and properties of polyglucan polymers available for a wide range of industrial and pharmaceutical uses, among other desirable phenotypes.

Thus, there exists a need for improved methods for producing plants and agricultural photosynthetic microbes comprising heterologous gene sequences which encode one or more enzyme(s) that result in production of an improved starch composition. In particular, these methods should provide general means for producing novel starch metabolic enzymes, including increasing the diversity of the starch metabolic enzyme gene pool and the rate at which genetic sequences encoding one or more starch metabolic enzyme species having desired properties are evolved. It is particularly desirable to have methods which are suitable for rapid evolution of genetic sequences to function in one or more plant species and confer an improved starch phenotype (e.g., increased control over branching structures, improved physiochemical properties, improved yield, enhanced cross-linkability, incorporation of advantageous moieties, improved catalytic efficiency via increasing Vmax and/or increasing the apparent affinity of substrates for a starch metabolizing enzyme, and/or as a source of purifiable enzymes for in vitro starch synthesis and modification, as well as plants which express the novel genetic sequence(s), and the uses of said plants and starch compositions.

The present invention meets these and other needs and provides such improvements and opportunities. The disclosed method for providing an agricultural organism having an improved NSME enzymatic phenotype by iterative gene shuffling and phenotype selection is a pioneering method which enables a broad range of novel and advantageous agricultural compositions, methods, kits, uses, plant cultivars, and apparatus which will be apparent to those skilled in the art in view of the present disclosure. Other features and advantages of the invention will be apparent from the following description of the drawings, preferred embodiments of the invention, the examples, and the claims.

SUMMARY OF THE INVENTION

In a broad aspect, the invention provides a method for obtaining a polynucleotide encoding a novel protein, having a unique or improved property, that can participate in starch metabolism, either catabolically or anabolically. Such a novel protein is called generically a Novel Starch Metabolic Enzyme ("NSME"). The NSME generally has one or more of the following enzymatic activities: starch synthase (starch synthase), amylase (alpha or beta type), branching enzyme (BE, BEI, BEIIa, BEIIb, BEIII, and the like), debranching enzyme (isoamylase or pullulanase), starch phosphorylase, or modified activities thereof. The method involves the following steps: (1) sequence shuffling of a plurality of polynucleotide species having sequence similarity to one or more naturally occurring genes encoding a plant, animal, or microbial enzyme involved in starch metabolism, thereby forming a library of recombinant or "shufflant" sequences, (2) expressing the shufflant sequences in a population of host cells or organisms, such that each species of shufflant sequence is expressed in a discrete host cell or organism (or its progeny), and (3) selecting those host cells or organisms which express a desirable starch metabolic phenotype.

Usually, the desirable starch metabolic phenotype is conferred by a modified enzyme activity of a starch metabolizing detected by any suitable method, such as enzyme assay, analysis of produced starch(es), and the like. Typically, the shufflant polynucleotides are recovered from the selected host cells or organisms and subjected to at least one additional round of sequence shuffling. Often, the process of shuffling, expression, selection, and recovery are performed recursively until the shuffling process yields sequences encoding proteins that have the desired starch metabolic phenotype. The resultant selected sequence(s) encode novel proteins having desired enzymatic activities in starch metabolism, and can be transferred in expressible form into plant cells, plants, or microbial cells participating in starch synthesis to yield novel starch compositions having desirable properties or chemistries.

In an embodiment, the invention provides an improved starch synthase or glycogen synthase, or shufflant thereof, and a polynucleotide encoding the same. In some embodiments, the polynucleotide is operably linked to a transcription regulation sequence forming an expression construct, which can be linked to a selectable marker gene; for embodiments where it is necessary to target a bacterial glycogen synthase shufflant into plant cell plastids, a sequence encoding a chloroplast transit peptide (CTP), such as that derived from Arabidopsis rbcS gene or amyloplast transit peptide, such as is known in the art, is fused in-frame to the shufflant glycogen synthase sequence, to ensure delivery of the glycogen synthase to the plastid compartment. In some embodiments, such a polynucleotide is present as an integrated transgene in a plant chromosome in a format for expression and processing of the glycogen synthase. It can be desirable for such a polynucleotide transgene to be transmissible via germline transmission in a plant; in the case of bacterial gene sequences transferred to plant or algal cells, it is often accompanied by a selectable marker gene which affords a means to select for progeny which retain the transferred shuffled glycogen synthase gene sequence. In some embodiments, the transferred shuffled glycogen synthase gene sequence is derived by shuffling a pool of parental sequences, at least one of which encodes a bacterial glycogen synthase or a substantial portion thereof. Often, the transcription control sequences comprise tuber-specific or seed-specific promoters to overcome possible detrimental effects of constitutive expression; the same may be used for expressing other NSME encoding sequences.

In alternative embodiments, the invention provides NSMEs that comprise branching enzymes, amylases, debranching enzymes, starch posphorylases, or the like. Methods for generating and isolating novel shuffled polynucleotides encoding polypeptides having modified catalytic activity as one or more of a starch branching enzyme, an amylase, a debranching enzyme or a starch posphorylase, wherein the modified catalytic activity is altered by at least one-half log unit as compared to the protein encoded by the known naturally-occurring gene sequence having the highest percentage of sequence identity to the protein encoded by the shuffled polynucleotide. The method involves transferring a library of shuffled polynucleotides encoding a starch metabolizing enzyme into a population of host cells, thereby producing a population of transformed host cells. In preferred embodiments, the host cells are lacking in an endogenous starch metabolizing enzyme corresponding to one or more starch metabolizing enzyme encoded by the shuffled polynucleotides. A subpopulation exhibiting a desired starch metabolic phenotype is selected from the population of transformed host cells, thereby forming a selected subpopulation of host cells harboring selected shuffled polynucleotides. Typically, the selected shuffled polynucleotides are then recovered, and at least one subsequent round of sequence shuffling, transfer and selection is performed, until a selected shufflant encoding an NSME having a desired enzymatic phenotype is obtained.

The present invention provides expression polynucleotides, e.g., plant transgenes, encoding an NSME polypeptide operably linked to a transcription regulatory sequence functional in plant cells, and optionally to a plastid transit peptide encoding sequence. In preferred embodiments, the transcription regulatory sequence controls expression in the starch-storing tissues and organs of an adult plant, such as may be obtained from a transgenic regenerable plant cell harboring said transgene.

The invention provides plant cells, regenerated plants, transgenic plants, cultivars, seeds, cuttings, reproductive organs, vegetative tissues, germplasm, isolated DNA, isolated nuclei, and the like, as well as algal cells and bacterial cells comprising expressible polynucleotides encoding an NSME, e.g., plants harboring an NSME transgene or transient expression construct. Often, such adult plants and plant tissues are obtained from regenerable plant cells transfected with the transgene; however, alternative means of introducing NSME-encoding sequences can be employed, including contacting plant tissues, seeds, cuttings, or whole plants with a solution containing the NSME sequences, either as transgenes, transient expression constructs, Agrobacterium tumefaciens vectors, or plant viral vectors and the like. In some variations, only the starch-storing organs of a plant are exposed to the means of introduction of NSME encoding sequences. In some variations, the plants are hybrids or other sterile variety incapable of sexual and/or asexual reproduction.

The invention provides the uses of: NSME polynucleotides; encoded NSME polypeptides; plants (including seeds) containing same; plant, algal, and bacterial cells expressing NSME polynucleotides; and starches produced by plants or cells expressing NSME polynucleotides.

The invention also provides compositions comprising harvested starch-storing organs of plants expressing an NSME encoding sequence and containing starch compositions which do not occur in nature or in the absence of expression of the NSME encoding sequence(s).

The invention also provides novel starch compositions produced by NSME-expressing cells and plants, said novel starch compositions having at least one chemical or physical property which is detectably distinctive from naturally-occurring starch compositions obtained from naturally-occurring cells and/or plants of the same species and grown under similar conditions. Such novel starch compositions are produced by cultivating starch-producing plant cells, plants, yeast, algae, or bacteria that harbor at least one expressible NSME gene; typically the NSME gene is a shuffled and selected starch synthase, glycogen synthase, ADP glucose pyrophosphorlyase, branching enzyme, debranching enzyme, amylase, starch phosphorylase, or the like.

As with many polymer-producing processes, the compositions produced thereby are complex compositions which are best described by reference to the specific process used to make the complex compositions. Thus, the invention provides a starch composition made by a plant cell, yeast cell, algal cell, or bacterium expressing at least one NSME gene that functions in starch synthesis. Various parameters of starch composition can be altered, including, but not limited to: glucosamine-enriched starches, mean main chain length, degree and mean length of branching, melting point, refraction index, tensile strength, viscosity, swelling volume, fractional lipid content, gelation, solubility, phosphate content, and other parameters known to those skilled in the art.

In an embodiment, the invention provides a method for producing starches having an enhanced proportion of derivatized or reactive sugars, the method comprising: incubating a NSME-expressing host cell in a medium containing a derivatized saccharide which can be incorporated into oligosaccharide by the NSME. Examples of derivatized saccharides include UDP-glucosamine, ADP-glucosamine, UDP-glucose-6-amine, and the like.

In another embodiment, the invention provides a yeast host cell expressing at least one NSME encoded by a shufflant polynucleotide, wherein the NSME catalyzes at least one step in the incorporation of UDP-glucose-6-amine into starch.

The invention provides a novel method for assaying the composition of starches in a high-throughput screening assay, particularly for assaying the degree of branching of synthesized starches, the method comprising employing a mass spectroscope to identify fragmented portions of starches obtained from sample cells, such as from reaction vessels containing cells harboring a discrete species of NSME shufflant enzyme. Such starch composition assays can be used for a variety of uses, including screening for NSME shufflant host cells which produce oligosaccharides (starches) having a desired composition.

In one embodiment, the mass spectroscopy (MS) starch composition assay involves: obtaining starch samples from a plurality of host cells or host plants harboring expressible NSME shufflant polynucleotides and cultured in individual culture vessels; and subjecting the starch samples individually to mass spectroscopic analysis on a triple quadrupole mass spectrometer and employing tandem mass spectroscopic analysis, thereby determining the composition of each starch sample.

The invention further provides a kit for obtaining a polynucleotide encoding a NSME protein, or subunit thereof, having a predetermined enzymatic phenotype, the kit comprising a cell line suitable for forming transformable host cells and a collection sequence-shuffled polynucleotides formed by in vitro sequence shuffling. The kit often further comprises a transformation enhancing agent (e.g., lipofection agent, PEG, etc.) and/or a transformation device (e.g., a biolistics gene gun) and/or a plant viral vector which can infect plant cells or protoplasts thereof.

DETAILED DISCUSSION OF THE INVENTION

Figure 1:
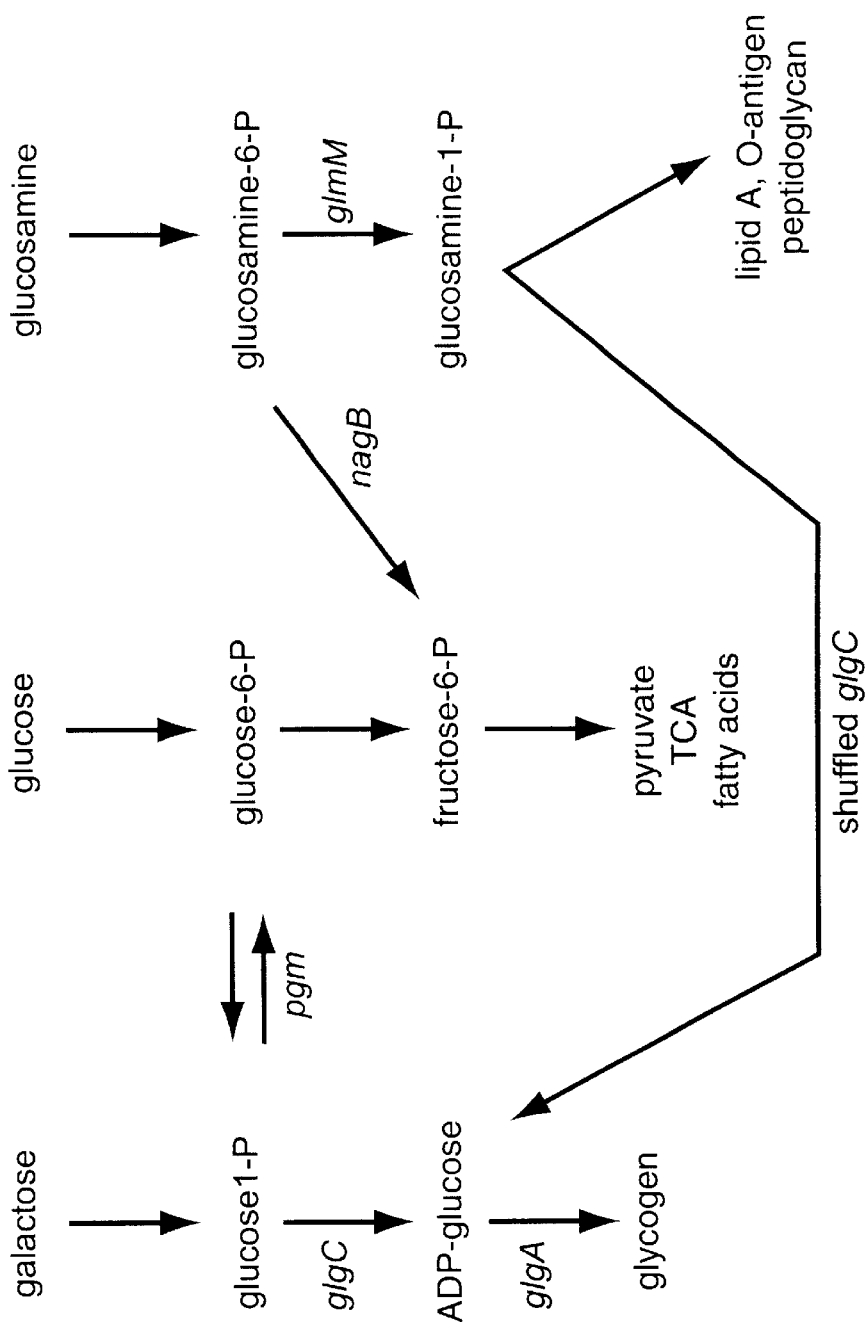
FIG. 1 shows a schematic representation of an exemplary starch biosynthetic pathway.

In a broad general aspect, the present invention provides a method for rapid evolution of polynucleotide sequences encoding a starch metabolic enzyme, or subunit thereof, that, when transferred into an appropriate plant cell, or photosynthetic microbial host and expressed therein, confers an enhanced metabolic phenotype to the host to increase starch formation ratio and/or rate, or to increase the accumulation or depletion of certain starches, and/or to provide novel starch compositions which have altered branching, crosslinking potential, size distribution, or incorporate desirable chemical moieties such as amine groups, aldehyde groups, phosphate groups, carboxylic acid groups, and the like, usually at the 6 or 2 position of the sugar ring of the polymer unit. In general, polynucleotide sequence shuffling and phenotype selection, such as detection of a parameter of starch metabolic enzyme activity, is employed recursively to generate polynucleotide sequences which encode novel proteins having desirable enzymatic catalytic function(s), regulatory function(s), and related enzymatic and physicochemical properties. Although the method is broadly applicable to evolving biosynthetic enzymes having desired properties, the invention is described principally with reference to the metabolic enzyme activities of plants and/or photosynthetic microbes and/or bacteria, defined as starch metabolic enzymes, or isozymes thereof.

DEFINITIONS

Unless defined otherwise, all technical and scientific terms used herein have the same meaning as commonly understood by one of ordinary skill in the art to which this invention belongs. Although any methods and materials similar or equivalent to those described herein can be used in the practice or testing of the present invention, the preferred methods and materials are described. For purposes of the present invention, the following terms are defined below.

As used herein, the term "novel starch metabolizing enzyme" or "NSME" refers to an enzyme, that is not found in nature, with catalytic activity (catabolic or anabolic) in a metabolic pathway resulting in the conversion of a sugar to a starch. Such an NSME can be, e.g., starch synthase, both soluble and bound (granule) forms, starch branching enzymes, starch debranching enzymes, amylases, starch phosphorylase, and the like.

As used herein "desired starch metabolizing phenotype" means a predetermined degree of modification of an enzyme parameter, such as Km for a substrate, Vmax, and the like, as measured relative to the most sequence identical naturally occurring proteins species in the collection of sequences know in the art, or a detectable physiochemical property of starch, such as viscosity, gelation, wettability, lipid content, tensile strength, chemical reactivity, crosslinkability, melting point, average moleculae weight, degree of branching, and other physiochemical parameters of starches known to those skilled in the art.

The term "reassembly" is used when recombination occurs between identical polynucleotide sequences.

By contrast, the term "shuffling" is used herein to indicate recombination between substantially homologous but non-identical polynucleotide sequences. In some embodiments, DNA shuffling may involve crossover via nonhomologous recombination, such as via cre/lox and/or flp/frt systems and the like, such that recombination need not require substantially homologous polynucleotide sequences. Homologous and non-homologous recombination formats can be used, and, in some embodiments, can generate molecular chimeras and/or molecular hybrids of substantially dissimilar sequences. Viral recombination systems, such as template-switching and the like can also be used to generate molecular chimeras and recombined genes, or portions thereof A general description of shuffling is provided in commonly-assigned WO98/13487 and WO98/13485, and in a number of other patents/publications discussed herein; in case of any conflicting description of definition between any of the incorporated documents and the text of this specification, the present specification provides the principal basis for guidance and disclosure of the present invention.

The term "related polynucleotides" means that regions or areas of the polynucleotides are identical and regions or areas of the polynucleotides are heterologous.

The term "chimeric polynucleotide" means that the polynucleotide comprises regions which are wild-type and regions which are mutated. It may also mean that the polynucleotide comprises wild-type regions from one polynucleotide and wild-type regions from another related polynucleotide.

The term "cleaving" means digesting the polynucleotide with enzymes or breaking the polynucleotide (e.g., by chemical or physical means), or generating partial length copies of a parent sequence(s) via partial PCR extension, PCR stuttering, differential fragment amplification, or other means of producing partial length copies of one or more parental sequences.

The term "population" as used herein means a collection of components such as polynucleotides, nucleic acid fragments or proteins. A "mixed population" means a collection of components which belong to the same family of nucleic acids or proteins (i.e. are related) but which differ in their sequence (i.e. are not identical) and hence in their biological activity.

The term "mutations" means changes in the sequence of a parent nucleic acid sequence (e.g., a gene or a microbial genome, transferable element, or episome) or changes in the sequence of a parent polypeptide. Such mutations may be point mutations such as transitions or transversions. The mutations may be deletions, insertions or duplications.

The term "recursive sequence recombination" as used herein refers to a method whereby a population of polynucleotide sequences are recombined with each other by any suitable recombination means (e.g., sexual PCR, homologous recombination, site-specific recombination, etc.) to generate a library of sequence-recombined species which is then screened or subjected to selection to obtain those sequence-recombined species having a desired property; the selected species are then subjected to at least one additional cycle of recombination with themselves and/or with other polynucleotide species and at subsequent selection or screening for the desired property.

The term "amplification" means that the number of copies of a nucleic acid fragment is increased.

The term "naturally-occurring" as used herein as applied to an object refers to the fact that an object can be found in nature. For example, a polypeptide or polynucleotide sequence that is present in an organism that can be isolated from a source in nature and which has not been intentionally modified by man in the laboratory is naturally-occurring. As used herein, laboratory strains and established cultivars of plants which may have been selectively bred according to classical genetics are considered naturally-occurring. As used herein, naturally-occurring polynucleotide and polypeptide sequences are those sequences, including natural variants thereof, which can be found in a source in nature, or which are sufficiently similar to known natural sequences that a skilled artisan would recognize that the sequence could have arisen by natural mutation and recombination processes.

As used herein "predetermined" means that the cell type, non-human animal, or virus may be selected at the discretion of the practitioner on the basis of a known phenotype.

As used herein, "linked" means in polynucleotide linkage (i.e., phosphodiester linkage). "Unlinked" means not linked to another polynucleotide sequence; hence, two sequences are unlinked if each sequence has a free 5' terminus and a free 3' terminus.

As used herein, the term "operably linked" refers to a linkage of polynucleotide elements in a functional relationship. A nucleic acid is "operably linked" when it is placed into a functional relationship with another nucleic acid sequence. For instance, a promoter or enhancer is operably linked to a coding sequence if it affects the transcription of the coding sequence. Operably linked means that the DNA sequences being linked are typically contiguous and, where necessary to join two protein coding regions, contiguous and in reading frame. However, since enhancers generally function when separated from the promoter by several kilobases and intronic sequences may be of variable lengths, some polynucleotide elements may be operably linked but not contiguous. A structural gene (e.g., an NSME gene) which is operably linked to a polynucleotide sequence corresponding to a transcriptional regulatory sequence of an endogenous gene is generally expressed in substantially the same temporal and cell type-specific pattern as is the naturally-occurring gene.

As used herein, the terms "expression cassette" refers to a polynucleotide comprising a promoter sequence and, optionally, an enhancer and/or silencer element(s), operably linked to a structural sequence, such as a cDNA sequence or genomic DNA sequence. In some embodiments, an expression cassette may also include polyadenylation site sequences to ensure polyadenylation of transcripts. When an expression cassette is transferred into a suitable host cell, the structural sequence is transcribed from the expression cassette promoter, and a translatabble message is generated, either directly or following appropriate RNA splicing. Typically, an expression cassette comprises: (1) a promoter, such as a CaMV 35S promoter, a NOS promoter or a rbcS promoter, or other suitable promoter known in the art, (2) a cloned polynucleotide sequence, such as a cDNA or genomic fragment ligated to the promoter in sense orientation so that transcription from the promoter will produce a RNA that encodes a functional protein, and (3) a polyadenylation sequence. For example and not limitation, an expression cassette of the invention may comprise the cDNA expression cloning vectors, pCD and NMT (Okayama H and Berg P (1983) Mol. Cell. Biol. 3: 280; Okayama H and Berg P (1985) Mol. Cell. Biol. 5: 1136, incorporated herein by reference). With reference to expression cassettes which are designed to function in chloroplasts, such as an expression cassette encoding an NSME in a higher plant, the expression cassette comprises the sequences necessary to ensure expression in chloroplasts or translocation of a nuclear-encoded form translated in the cytoplasm into the chloroplast. For embodiments wherein the NSME subunits(s) are expressed in chloroplasts, typically the subunit encoding sequence is flanked by two regions of homology to the plastid genome so as to effect a homologous recombination with the chloroplastid genome; often a selectable marker gene is also present within the flanking plastid DNA sequences to facilitate selection of genetically stable transformed chloroplasts in the resultant transplastonic plant cells (see Maliga P (1993) TIBTECH 11: 101; Daniell et al. (1998) Nature Biotechnology 16: 346, and references cited therein).

As used herein, the term "transcriptional unit" or "transcriptional complex" refers to a polynucleotide sequence that comprises a structural gene (exons), a cis-acting linked promoter and other cis-acting sequences necessary for efficient transcription of the structural sequences, distal regulatory elements necessary for appropriate tissue-specific and developmental transcription of the structural sequences, and additional cis sequences important for efficient transcription and translation (e.g., polyadenylation site, mRNA stability controlling sequences).

As used herein, the term "transcription regulatory region" refers to a DNA sequence comprising a functional promoter and any associated transcription elements (e.g., enhancer, CCAAT box, TATA box, LRE, ethanol-inducible element, etc.) that are essential for transcription of a polynucleotide sequence that is operably linked to the transcription regulatory region.

As used herein, the term "xenogeneic" is defined in relation to a recipient genome, host cell, or organism and means that an amino acid sequence or polynucleotide sequence is not encoded by or present in, respectively, the naturally-occurring genome of the recipient genome, host cell, or organism. Xenogenic DNA sequences are foreign DNA sequences. Further, a nucleic acid sequence that has been substantially mutated (e.g., by site directed mutagenesis) is xenogeneic with respect to the genome from which the sequence was originally derived, if the mutated sequence does not naturally occur in the genome.

The term "corresponds to" is used herein to mean that a polynucleotide sequence is homologous (i.e., identical) to all or a portion of a reference polynucleotide sequence, or that a polypeptide sequence is identical to a reference polypeptide sequence. In contradistinction, the term "complementary to" is used herein to mean that the complementary sequence is homologous to all or a portion of a reference polynucleotide sequence. For illustration, the nucleotide sequence "5'-TATAC" corresponds to a reference sequence "5'-TATAC" and is complementary to a reference sequence "5'-GTATA".

The following terms are used to describe the sequence relationships between two or more polynucleotides: "reference sequence", "comparison window", "sequence identity", "percentage of sequence identity", and "substantial identity". A "reference sequence" is a defined sequence used as a basis for a sequence comparison; a reference sequence may be a subset of a larger sequence, for example, as a segment of a full-length viral gene or virus genome. Generally, a reference sequence is at least 20 nucleotides in length, frequently at least 25 nucleotides in length, and often at least 50 nucleotides in length. Since two polynucleotides may each comprise (1) a sequence (i.e., a portion of the complete polynucleotide sequence) that is similar between the two polynucleotides, and (2) a sequence that is divergent between the two polynucleotides, sequence comparisons between two (or more) polynucleotides are typically performed by comparing sequences of the two polynucleotides over a "comparison window" to identify and compare local regions of sequence similarity.

A "comparison window", as used herein, refers to a conceptual segment of at least 25 contiguous nucleotide positions wherein a polynucleotide sequence may be compared to a reference sequence of at least 25 contiguous nucleotides and wherein the portion of the polynucleotide sequence in the comparison window may comprise additions or deletions (i.e., gaps) of 20 percent or less as compared to the reference sequence (which for comparative purposes in this manner does not comprise additions or deletions) for optimal alignment of the two sequences. Optimal alignment of sequences for aligning a comparison window may be conducted by the local homology algorithm of Smith and Waterman (1981) *Adv. Appl. Math.* 2: 482, by the homology alignment algorithm of Needleman and Wunsch (1970) *J. Mol. Biol.* 48: 443, by the search for similarity method of Pearson and Lipman (1988) *Proc. Natl. Acad. Sci. (U.S.A.)* 85: 2444, by computerized implementations of these algorithms (GAP, BESTFIT, FASTA, and TFASTA in the Wisconsin Genetics Software Package Release 7.0, Genetics Computer Group, 575 Science Dr., Madison, WI), or by inspection, and the best alignment (i.e., resulting in the highest percentage of homology over the comparison window) generated by the various methods is selected.

The term "sequence identity" means that two polynucleotide sequences are identical (i.e., on a nucleotide-by-nucleotide basis) over the window of comparison. The term "percentage of sequence identity" is calculated by comparing two optimally aligned sequences over the window of comparison, determining the number of positions at which the identical nucleic acid base (e.g., A, T, C, G, U, or I) occurs in both sequences to yield the number of matched positions, dividing the number of matched positions by the total number of positions in the window of comparison (i.e., the window size), and multiplying the result by 100 to yield the percentage of sequence identity. The term "substantial identity" as used herein denotes a characteristic of a polynucleotide sequence, wherein the polynucleotide comprises a sequence that has at least 80 percent sequence identity, preferably at least 85 percent identity and often 89 to 95 percent sequence identity, more usually at least 99 percent sequence identity as compared to a reference sequence over a comparison window of at least 20 nucleotide positions, optionally over a window of at least 30-50 nucleotides, wherein the percentage of sequence identity is calculated by comparing the reference sequence to the polynucleotide sequence that may include deletions or additions which total 20 percent or less of the reference sequence over the window of comparison. The reference sequence may be a subset of a larger sequence.

Specific hybridization is defined herein as the formation, by hydrogen bonding or nucleotide (or nucleobase) bases, of hybrids between a probe polynucleotide (e.g., a polynucleotide of the invention and a specific target polynucleotide, wherein the probe preferentially hybridizes to the specific target such that, for example, a single band corresponding to, e.g., one or more of the RNA species of the gene (or specifically cleaved or processed RNA species) can be identified on a Northern blot of RNA prepared from a suitable source. Such hybrids may be completely or only partially base-paired. Polynucleotides of the invention which specifically hybridize to viral genome sequences may be prepared on the basis of the sequence data provided herein and available in the patent applications incorporated herein and scientific and patent publications noted above, and according to methods and thermodynamic principles known in the art and described in Sambrooke et al. et al., *Molecular Cloning: A Laboratory Manual*, 2nd Ed., (1989), Cold Spring Harbor, N.Y.; Berger and Kimmel, *Methods in Enzvmology, Volume* 152. *Guide to Molecular Cloning Techniques* (1987), Academic Press, Inc., San Diego, Calif.; Goodspeed et al. (1989) *Gene* 76: 1; Dunn et al. (1989) *J. Biol. Chem.* 264: 13057, and Dunn et al. (1988) *J. Biol. Chem.* 263: 10878, which are each incorporated herein by reference.

"Physiological conditions" as used herein refers to temperature, pH, ionic strength, viscosity, and like biochemical parameters that are compatible with a viable plant organism or agricultural microorganism (e.g., Rhizobium, Agrobacterium, etc.), and/or that typically exist intracellularly in a viable cultured plant cell, particularly conditions existing in the nucleus of said cell. In general, in vitro physiological conditions can comprise 50–200 mM NaCl or KCl, pH 6.5–8.5, 20–45 C and 0.001–10 mM divalent cation (e.g., Mg++, Ca++); preferably about 150 mM NaCl or KCl, pH 7.2–7.6, 5 mM divalent cation, and often include 0.01–1.0 percent nonspecific protein (e.g., BSA). A non-ionic detergent (Tween, NP-40, Triton X-100) can often be present, usually at about 0.001 to 2%, typically 0.05–0.2% (v/v). Particular aqueous conditions may be selected by the practitioner according to conventional methods. For general guidance, the following buffered aqueous conditions may be applicable: 10–250 mM NaCl, 5–50 mM Tris HCI, pH 5–8, with optional addition of divalent cation(s), metal chelators, nonionic detergents, membrane fractions, antifoam agents, and/or scintillants.

As used herein, the terms "label" or "labeled" refer to incorporation of a detectable marker, e.g., a radiolabeled amino acid or a recoverable label (e.g. biotinyl moieties that can be recovered by avidin or streptavidin). Recoverable labels can include covalently linked polynucleobase sequences that can be recovered by hybridization to a complementary sequence polynucleotide. Various methods of labeling polypeptides, PNAs, and polynucleotides are known in the art and may be used. Examples of labels include, but are not limited to, the following: radioisotopes (e.g., $^3H$, $^{14}C$, $^{35}S$, $^{125}I$, $^{131}I$), fluorescent or phosphorescent labels (e.g., FITC, rhodamine, lanthanide phosphors), enzymatic labels (e.g., horseradish peroxidase, -galactosidase, luciferase, alkaline phosphatase), biotinyl groups, predetermined polypeptide epitopes recognized by a secondary reporter (e.g., leucine zipper pair sequences, binding sites for antibodies, transcriptional activator polypeptide, metal binding domains, epitope tags). In some embodiments, labels are attached by spacer arms of various lengths, e.g., to reduce potential steric hindrance.

As used herein, the term "statistically significant" means a result (i.e., an assay readout) that generally is at least two standard deviations above or below the mean of at least three separate determinations of a control assay readout and/or that is statistically significant as determined by Student's t-test or other art-accepted measure of statistical significance.

The term "transcriptional modulation" is used herein to refer to the capacity to either enhance transcription or inhibit transcription of a structural sequence linked in cis; such enhancement or inhibition may be contingent on the occurrence of a specific event, such as stimulation with an inducer and/or may only be manifest in certain cell types.

The term "agent" is used herein to denote a chemical compound, a mixture of chemical compounds, a biological macromolecule, or an extract made from biological materials such as bacteria, plants, fungi, or animal cells or tissues. Agents are evaluated for potential activity as NSME inhibitors or allosteric effectors by inclusion in screening assays described hereinbelow.

As used herein, "substantially pure" means an object species is the predominant species present (i.e., on a molar basis it is more abundant than any other individual macromolecular species in the composition), and preferably a substantially purified fraction is a composition wherein the object species comprises at least about 50 percent (on a molar basis) of all macromolecular species present. Generally, a substantially pure composition will comprise more than about 80 to 90 percent of all macromolecular species present in the composition.

Most preferably, the object species is purified to essential homogeneity (contaminant species cannot be detected in the composition by conventional detection methods) wherein the composition consists essentially of a single macromolecular species. Solvent species, small molecules (<500 Daltons), and elemental ion species are not considered macromolecular species.

As used herein, the term "optimized" is used to mean substantially improved in a desired structure or function relative to an initial starting condition, not necessarily the optimal structure or function which could be obtained if all possible combinatorial variants could be made and evaluated, a condition which is typically impractical due to the number of possible combinations and permutations in polynucleotide sequences of significant length (e.g., a complete plant gene, genes or even a genome).

As used herein, "NSME enzymatic phenotype" means an observable or otherwise detectable phenotype that can be discriminative based on NSME function. For example and not limitation, an NSME enzymatic phenotype can comprise an enzyme Km for a substrate, Km for an inhibitor ($K_I$), Km for an activator (Ka), Vmax, a turnover rate, an inhibition coefficient (Ki), or an observable or otherwise detectable trait that reports NSME function in a cell or clonal progeny thereof, including an adult plant or starch-storing organ thereof, which otherwise lack said trait in the absence of significant NSME function.

OVERVIEW

The invention relates in part to a method for generating novel or improved starch metabolizing enzymes, nucleic acids encoding such enzymes and improved starch production phenotypes which do not naturally occur, or would not be expected to occur, at a substantial frequency in nature. A broad aspect of the method employs nucleotide sequence recombination, termed "sequence shuffling", which enables the rapid generation of a collection of broadly diverse phenotypes that can be selectively bred for a broader range of novel phenotypes or more extreme phenotypes than would otherwise occur by natural evolution in the same time period. A basic variation of the method is a recursive process comprising: (1) sequence shuffling of a plurality of species of a genetic sequence, which species may differ by as little as a single nucleotide difference or may be substantially different yet retain sufficient regions of sequence similarity or site-specific recombination junction sites to support shuffling recombination, (2) selection of the resultant shuffled genetic sequence to isolate or enrich a plurality of shuffled genetic sequences having a desired phenotype(s), and (3) repeating steps (1) and (2) on the plurality of shuffled genetic sequences having the desired phenotype(s) until one or more variant genetic sequences encoding a sufficiently optimized desired phenotype is obtained. In this general manner, the method facilitates the "forced evolution" of a novel or improved genetic sequence to encode a desired NSME enzymatic phenotype which natural selection and evolution has heretofore not generated in the reference agricultural organism.

Typically, a plurality of NSME genetic sequences are shuffled and selected by the present method. The method can be used with a plurality of alleles, homologs, or cognate genes of a genetic locus, or even with a plurality or genetic sequences from related organisms, and in some instances with unrelated genetic sequences or portions thereof which have recombinogenic portions (either naturally or generated via genetic engineering). Furthermore, the method can be used to evolve a heterologous NSME sequence (e.g., a non-naturally occurring mutant gene) to optimize its function in concert with a complementing subunit, and/or in a particular host cell.

NSME

NSME shufflants are generated by any suitable shuffling method from one or more parental sequences, optionally including mutagenesis, and the resultant shufflants are introduced into a suitable host cell, typically in the form of expression cassettes wherein the shuffled polynucleotide sequence encoding the NSME is operably linked to a transcriptional regulatory sequence and any necessary sequences for ensuring transcription, translation, and processing of the encoded NSME protein. Each such expression cassette or its shuffled NSME encoding sequence can be referred to as a "library member" composing a library of shuffled NSME sequences. The library is introduced into a population of host cells, such that individual host cells receive substantially one or a few species of library member(s), to form a population of shufflant host cells expressing a library of shuffled NSME species. The population of shufflant host cells is screened so as to isolate or segregate host cells and/or their progeny which express NSME(s) having the desired enhanced phenotype. The shuffled NSME encoding sequence(s) is/are recovered from the isolated or segregated shufflant host cells, and typically subjected to at least one subsequent round of mutagenesis and/or sequence shuffling, introduced into suitable host cells, and selected for the desired enhanced enzymatic phenotype; this cycle is generally performed iteratively until the shufflant host cells express an NSME having the desired expression level or enzymatic phenotype or e.g., until the rate of improvement in the desired enzymatic phenotype produced by shuffling has substantially plateaued. The shufflant NSME polynucleotides expressed in the host cells following the iterative process of shuffling and selection encode NSME specie(s) having the desired enhanced phenotype.

For illustration and not to limit the invention, examples of a desired starch synthase enzymatic phenotype can include an increased substrate usage rate at a given substrate concentration, decreased inhibition by an inhibitor (desensitization), increased Km for inhibitor (desensitization), increased activation by an activator (desensitization), decreased Km for activator (desensitization), complete lack of need for activation (desensitization), decreased ratio of Km for activator to Km for inhibitor, velocity (Vmax) for substrate use, enhanced incorporation of derivatized sugars as substrates (substrate promiscuity or modified substrate preference) and the like as described herein and as may be desired by the skilled artisan.

In a variation, host cells transformed with expressible NSME shufflants are incubated in discrete vessels, such as wells of a 96-well microtitre plate, and the host cells in each well are lysed or otherwise made permeable so that the enzyme encoded by the NSME shufflant(s) in each well are made soluble and the resultant soluble NSME shufflant species are assayed for activity by conducting an appropriate enzymatic assay on a supernatant portion from each individual (or pooled) well(s).

The present invention provides methods, reagents, genetically modified plants, plant cells and protoplasts thereof, microbes, and polynucleotides, and compositions relating to the forced evolution of NSME sequences to improve an enzymatic property of an NSME protein. In an aspect, the invention provides a shuffled NSME which is catalytically active and which exhibits an improved enzymatic profile, such as an increased Km for inhibitor, decreased Km for activator, and or a decreased Km for substrate, increased Vmax, or the like, or which, when expressed in a host cell, confers upon said host cell the phenotype of producing starch having a desired physicochemical property.

In a broad aspect, the invention is based, in part, on a method for shuffling polynucleotide sequences that encode an NSME gene, or combinations thereof. The method comprises the step of selecting at least one polynucleotide sequence that encodes an NSME having an enhanced enzymatic phenotype and subjecting said selected polynucleotide sequence to at least one subsequent round of mutagenesis and/or sequence shuffling, and selection for the enhanced phenotype. Preferably, the method is performed recursively on a collection of selected polynucleotide sequences encoding the NSME, to iteratively provide polynucleotide sequences encoding NSME species having the desired enhanced enzymatic phenotype.

Parental sequences encoding starch metabolizing enzymes are well known to those of skill in the art. Starch metabolic enzymes include: starch synthase (both soluble isozymes and bound isozymes), branching enzymes, debranching enzymes (isoamylases and pullulanases), amylase (alpha and beta), and starch phosphorylase, with respect to gene sequences that are derived from higher plants. In certain embodiments, gene sequences encoding microbial starch metabolic enzymes such as glycogen synthase ("GS"; gIgA gene product), glgC gene product (ADP glucose pyrophosphorylase), phosphoglucomutase ("pgm"), and the like are employed in the method. In certain embodiments, gene sequences encoding animal liver glycogen synthase or yeast glycogen synthase are used.

Coding sequences for various starch metabolizing enzyme species are disclosed in the literature and Genbank, among other public sources, and may be obtained by cloning, synthesis, PCR, from deposited materials, or using any other available source or method. All sequences referred to herein or equivalents which function in the disclosed methods can be retrieved by GerBank database file designation or a commonly used reference name which is indexed in GenBank or otherwise published are incorporated herein by reference and are publicly available. Exemplary enzymes and their Genbank accession numbers are given in Table 1.

The specific enzyme genes which are employed in the present method involving gene sequence shuffling are available to the practitioner in the art and can be obtained via the use of routine cloning and PCR methods.

The following publications provide examples of well known starch metabolizing enzymes and are incorporated herein by reference: Zeeman et al. (1998) *The Plant Cell* 10: 1699; Romeo et al. (1993) *J. Bact.* 175: 4744; Damotte et al. (1968) *BBRC* 32: 916; Guan et al. (1993) *Plant Physiol*.102: 1269; Nakamura et al. (1998) *Plant Physiol.* 118: 451; Swinkels JJM (1985) *Starch* 1: 1; Bhattacharyya et al. (1990) *Cell* 60: 115; Ko13mann et al. (1991) *Mol Gen Genet* 230:39; Sun et al. (1998) *Plant Physiol.* 118:37; and Buleon et al. (1998) *Int. J. Biological Macromolecules* 23: 85).

The invention provides shuffled NSME encoding sequences, wherein said shuffled encoding sequences comprise at least 21 contiguous nucleotides, preferably between 30 and 100 contiguous nucleotides, or more, of a first naturally occurring gene sequence encoding a starch metabolizing enzyme and at least 21 contiguous nucleotides, preferably between 30 and 100 contiguous nucleotides, or more, of a second naturally occurring gene sequence encoding a starch metabolizing enzyme, operably linked in reading frame to encode an NSME which has activity in the presence of a suitable host cell, and which has an enhanced enzymatic phenotype. In some variations, it will be possible to use shuffled starch metabolizing enzyme encoding sequences which have less than 21 contiguous nucleotides identical to a naturally-occurring gene sequence encoding a starch metabolizing enzyme.

TABLE 1

Exemplary Starch Metabolizing Enzymes.

| Enzyme | Accession Number | Gene | Source |
|---|---|---|---|
| ADP-glucose pyrophosphorylase | AW596426 | cDNA clone | *Glycine max* |
| | ATCHRIV90 | GAT4g3921 | *Arabidopsis thaliana* |
| | D90917 | agp | *Synechocystis sp.* PCC6803 |
| | AF101045 | SH2 subunit | *Oryza sativa* |
| | AL133278 | glgC | *Streptomyces coelicolor* |
| | AB018190 | mRNA | *Nicotiana tabacum* |
| | AF184598 | agpL mRNA | *Citrus unshiu* (large subunit) |
| | AF18457 | agpS mRNA | *Citrus unshiu* (small subunit) |
| | AW036391 | agpL2 mRNA | *Lycopersicon esculentum* |
| | AW031424 | agpS2 mRNA | *Lycopersicon esculentum* |
| | AF097729 | glgC | *Rhodospirillum rubrum* |
| | AF181035 | glgC | *Rhodobacter sphaeroides* |
| | Z25795 | glgC | *Bacillus subtilis* |
| | AF033856 | glgC | *Agrobacterium tumefaciens* |
| Starch synthase (Starch synthetase) | AF181035 | glgA | *Rhodobacter sphaeroides* |
| | AJ243803 | glgA | *Streptomyces coelicolor* |
| | Z25795 | glgA | *Bacillus subtilis* |
| | D87026 | glgA | *Bacillus stearothermophilus* |
| | D90899 | glgA | *Synechocystis sp.* PCC6803 |
| | D90915 | glgA | *Synechocystis sp.* PCC6803 |
| | AE000657 | glgA | *Aquifex aeolicus* |
| | AF033856 | glgA | *Agrobacterium tumefaciens* |
| | AL161548 | AT4g18240 | *Arabidopsis thaliana* |
| | AW161548 | cDNA | *Glycine max* |
| | AW324979 | cDNA | *Glycine max* |
| | AW432571 | cDNA | *Glycine max* |
| | AW508018 | cDNA | *Glycine max* |
| | AW472193 | cDNA | *Glycine max* |
| | AW472190 | cDNA | *Glycine max* |
| | AW310103 | cDNA | *Glycine max* |
| | AF121673 | Gene | *Arabidopsis thaliana* |
| | D16202 | cDNA | *Oryza sativa* |
| | AF163319 | mRNA | *Triticum aestivum* |
| | AB029064 | GBSSI | *Triticum durum* |
| | AB029063 | GBSSI | *Triticum durum* |
| | AB029062 | GBSSI | *Triticum dicoccoides* |
| | AB029061 | GBSSI | *Triticum dicoccoides* |
| | AF173900 | GBSSI | *Manihot esculenta* |
| | AF173652 | GBSSI | *Beta vulgaris* |
| | AF110375 | wx-TtD | *Aegilops tauschii* |
| | AF110374 | wx-TsB | *Aegilops speltiodes* |
| | AB028026 | mRNA | *Nicotiana tabacum* |
| Branching Enzyme | Z25795 | glgB | *Bacillus subtilis* |
| | M25089 | glgB | *Bacillus stearothermophilus* |
| | U00096 | glgB | *Escherichia coli* |
| | D63999 | glgB | *Synechocysits sp.* PCC6803 |
| | AL138978 | glgB | *Streptomyces coelicolor* |
| | AF033856 | glgB | *Agrobacterium tumefaciens* |
| | AL162506 | F17C15 70 | *Arabidopsis thaliana* |
| | AW620954 | cDNA | *Glycine max* |
| | AW596011 | cDNA | *Glycine max* |
| | AW397653 | cDNA | *Glycine max* |
| | D16021 | BE3 mRNA | rice |
| | D10838 | SBE mRNA | rice |
| | D11082 | BE1 mRNA | rice |
| | D11081 | BE1 mRNA | maize |
| Amylase | AP001539 | genomic DNA | *Oryza sativa* |
| | AW620230 | cDNA | *Glycine max* |
| | AW597215 | cDNA | *Glycine max* |
| | AW569065 | cDNA | *Glycine max* |
| | AW569064 | cDNA | *Glycine max* |
| | AW568671 | cDNA | *Glycine max* |
| | AW568648 | cDNA | *Glycine max* |
| | AW568612 | cDNA | *Glycine max* |
| | AW568347 | cDNA | *Glycine max* |
| | AW568345 | cDNA | *Glycine max* |
| | AW568293 | cDNA | *Glycine max* |
| | AW568243 | cDNA | *Glycine max* |

TABLE 1-continued

Exemplary Starch Metabolizing Enzymes.

| Enzyme | Accession Number | Gene | Source |
|---|---|---|---|
| | AW568128 | cDNA | Glycine max |
| | AW568092 | cDNA | Glycine max |
| | AW568059 | cDNA | Glycine max |
| | AW568006 | cDNA | Glycine max |
| | AL161562 | genomic | Arabidopsis thaliana |
| | AL161545 | genomic | Arabidopsis thaliana |
| | AL161472 | genomic | Arabidopsis thaliana |
| | AL161540 | genomic | Arabidopsis thaliana |
| | M11450 | gene | Bacillus stearothermophilus |
| | AB015592 | gene | Bacillus subtilis |
| | AL031825 | SPCC757.12 | Schizosaccharomyces pombe |
| Pullulanase | X83969 | PULSPO | Solanum oleracea |
| | AB012915 | gene | Oryza sativa |
| | AF096862 | pulA | Fervidobacterium pennivorans |
| | AE001821 | TM1845 | Thermotoga maritime |
| | AF122049 | gene | Hordeum vulgare |
| | AF113969 | apuA | Thermococcus hydrothermalis |
| | AF080567 | zpu1 | Zea mays |
| | U66897 | susA | Bacteroided thetaiotaomicron |
| Debranching Enzyme | AF181035 | glgX | Rhodobacter sphaeroides |
| | D90908 | glgX | Synechocystis sp. PCC6803 |
| | D90900 | glgX | Synechocystis sp. PCC6803 |
| | AW034518 | glgX | Lycopersicon esculentum |
| | AL161579 | AT4g31770 | Arabidopsis thaliana |
| | AL157916 | glgX2 | Streptomyces coelicolor |
| | AB012915 | gene | Oryza sativa |
| | U00096 | glgX | Escherichia coli |
| | Z98849 | dbr1 | Schizosaccharomyces pombe |
| | AB018078 | gene | Saccharomyces cerevisiae |
| | AF080567 | zpu1 | Zea mays |
| Isoamylase | AL161513 | genomic | Arabidopsis thaliana |
| | AF002109 | genomic | Arabidopsis thaliana |
| | AF142591 | ios1 mRNA | Solanum tuberosum |
| | AF142588 | gene | Hordeum vulgare |
| | AF142589 | gene | Hordeum vulgare |
| | AF142590 | gene | Triticum Aestivum |
| | D88029 | gene | Flavobacterium odoratum |
| | AF030882 | sugary1 | Zea mays |
| | U90120 | iam | Flavobacterium sp. |
| | AB030882 | mRNA | Oryza sativa |
| | U18908 | Sulp | Zea mays |
| | M25247 | gene | Pseudomonas sp. SMP1 |
| | J03871 | iam | Pseudomonas amyloderamosa |
| Starch Phosphorylase | D90907 | glgP | Synechocystis sp. PCC6803 |
| | U00096 | glgP | Escherichia coli |
| | L42023 | glgP | Haemophilus influenzy |
| | AE000657 | glgP | Aquifex aeolicus |
| | D87026 | glgP | Bacillus stearothermophilus |
| | AF033856 | glgP | Agrobacterium tumefaciens |
| | AF181035 | glgP | Rhodobacter sphaeroides |
| | Z25795 | glgP | Bacillu subtilis |
| | U89521 | glgP | Haemophilus actinomycetemcomitans |
| | L13771 | glgP | Zea mays |
| | L12770 | glgP | Zea mays |
| | AL133292 | gene | Arabidopsis thaliana |
| | AF173676 | Stp | Beta vulgaris |
| | AF143202 | gene | Solanum tuberosum |
| | L25626 | gene | Ipomoea batatas |
| | X73684 | STP-1 | Solanum tuberosum |
| | X52385 | gene | Solanum tuberosum |
| | M64362 | gene | Ipomoea batatas |

Oligonucleotides can be synthesized e.g., on an Applied Bio Systems oligonucleotide synthesizer according to specifications provided by the manufacturer, or can be ordered e.g., from Operon Technologies (Alameda, Calif.). Methods for PCR amplification are described in the art (*PCR Technology: Principles and Applications for DNA Amplification* ed. HA Erlich, Freeman Press, New York, NY (1992); *PCR Protocols: A Guide to Methods and Applications*, eds. Innis, Gelfland, Snisky, and White, Academic Press, San Diego, CA (1990); Mattila et al. (1991) *Nucleic Acids Res.* 19: 4967; Eckert, K. A. and Kunkel, T. A. (1991) PCR *Methods and Applications* 1: 17; *PCR*, eds. McPherson, Quirkes, and Taylor, IRL Press, Oxford; and U.S. Pat. No. 4,683,202, which are incorporated herein by reference). Leaf PCR is suitable for genotype analysis of transgenote plants.

Generally, the nomenclature used hereafter and the laboratory procedures in cell culture, molecular genetics, virology, and nucleic acid chemistry and hybridization described below are those well known and commonly employed in the art. Standard techniques are used for recombinant nucleic acid methods, polynucleotide synthesis, and microbial culture and transformation (e.g., biolistics, Agrobacterium (Ti plasmid), electroporation, lipofection). Generally, enzymatic reactions and purification steps are performed according to the manufacturer's specifications. The techniques and procedures are generally performed according to conventional methods in the art and various general references (see, generally, Sambrook et al. *Molecular Cloning: A Laboratory Manual*, 2d ed. (1 989) Cold Spring Harbor Laboratory Press, Cold Spring Harbor, N.Y., Ausubel et al. *Current Protocols in Molecular Biology*, Current Protocols, John Wiley & Sons, Inc., [supplemented through 1999])which are provided throughout this document. The procedures therein are believed to be well known in the art and are provided for the convenience of the reader. All the information contained therein is incorporated herein by reference.

MODIFICATION OF SUBSTRATE USAGE

The invention provides an isolated polynucleotide encoding an enhanced NSME, e.g., a starch synthase, amylase, isoamylase, etc., having catalytic activity wherein the Km for designated substrate is significantly lower than that of a protein encoded by a parental polynucleotide encoding a naturally-occurring starch metabolizing enzyme. For example, the invention provides a starch synthase wherein the Km for ADP-glucose or for a derivatized glucose substrate (ADP-glucose-6-amine, ADP-glucose-6-aldehyde, ADP-glucose-6-carboxylic acid, UDP-glucose-6-amine, alternative NDP-glucose molecules comprising position 6 reactive substituents, as well as ADP-, UDP- and NDP-glucose molecules comprising position 2 reactive substituents, and the like) is significantly lower than in a protein encoded by a parental polynucleotide encoding a naturally-occurring starch synthase enzyme. Typically, the Km for ADP-glucose or for a derivatized glucose substrate will be at least one-half logarithm unit lower than the parental sequence, preferably the Km will be at least one logarithm unit lower, and desirably the Km will be at least two logarithm units lower, or more. The isolated polynucleotide encoding an enhanced starch synthase protein and in an expressible form can be transferred into a host plant, such as a crop species, wherein suitable expression of the polynucleotide in the host plant will result in improved starch composition, such as having an increased proportion of reactive moieties of the amine, aldehyde, and/or carboxylic acid type as compared to the naturally-occurring host plant species, under similar conditions. The isolated polynucleotide can encode a single species of protein which is not found to occur naturally in nature but is often at least about 70 percent, frequently at least about 80 percent, sometimes about 90 percent and occasionally 95 percent or more, sequence identical to a soluble or bound starch synthase gene or a bacterial glycogen synthase gene. The isolated polynucleotide can comprise a substantially full-length or full-length coding sequence substantially identical to a naturally occurring starch synthase gene or glycogen synthase gene. One embodiment comprises shuffling and selection of polynucleotides encoding a soluble starch synthase protein that is at least at least about 70%, frequently at least about 80%, sometimes at least about 90%, and occasionally 95% or more sequence identical to the polypeptide sequence of a naturally-occurring soluble starch synthase gene of a higher plant species, and wherein the selected shufflant(s) encode a protein having a Km for a derivatived glucose substrate at least one-half logarithm unit lower, preferably at least one logarithm unit or more lower, than the most highly sequence identical naturally-occurring soluble starch synthase of higher plants.

In a variation, the shuffled soluble starch synthase exhibits a Vmax for starch formation using ADP-glucose or a derivatized glucose substrate that is at least one-half logarithm unit higher than the most highly sequence identical naturally-occurring soluble starch synthase of higher plants. For example, the invention provides a polynucleotide sequence encoding a shuffled starch synthase protein at least 70 percent sequence identical to a naturally-occurring starch synthase of a plant or algal cell, wherein the shuffled starch synthase possesses a detectable enzymatic activity wherein: (1) the Vmax for starch synthase catalytic activity is substantially higher than the Vmax for starch synthase catalytic activity of naturally-occurring starch synthase under equivalent assay conditions (e.g., same concentration(s) of substrates, etc.), and/or (2) the substrate $Km^{-1}$ is at least 50 percent greater than that of a naturally-occurring starch synthase that is most highly sequence identical to the polypeptide sequence of the shufflant starch synthase (i.e., the polypeptide that has the greatest percentage sequence identity, among the collection of then-known naturally-occurring starch synthase sequences, to the shufflant-encoded polypeptide).

In addition, the invention provides a means to evolve NSME gene variants and/or suitable host cells, as well as providing a model system for evaluating a library of agents to identify candidate agents that could find use as agricultural reagents for commercial applications. Such agents may exhibit selectivity for inhibition of a naturally-occurring starch metabolizing enzyme and may be substantially less effective at inhibiting a shuffled NSME enzyme which has been evolved to be resistant to the agent.

INTERSPECIES ADAPTATION

In another aspect, the invention provides a method for adapting the sequence of a plant or algal starch metabolizing enzyme (e.g., a starch synthase, an isoamylase, an amylase, etc.) encoding sequence obtained from the genome (or cDNA represented therefrom) of a first taxonomic species to function adequately and/or optimally when transferred as a transgene into a host cell or genome of a second taxonomic species. For example, to adapt a starch synthase the method comprises: (1) effecting nucleotide sequence shuffling of a plurality of polynucleotide species encoding all or an enzymatically active portion of a starch synthase, at least one polynucleotide species of which is derived from the genome or mRNA of a first taxonomic species of plant or algae, and at least one other polynucleotide species of which is a related sequence polynucleotide having at least about 70%, frequently at least about 80%, sometimes at least about 90%, and occasionally 95% or more sequence identity to a naturally-occurring starch synthase or glycogen synthase and preferably is a sequence which naturally occurs in the genome of the second taxonomic species, thereby forming a population of starch synthase shufflant polynucleotides; (2) introducing said population of starch synthase shufflant polynucleotides in expressible form into host cells in which they can be expressed, thereby forming a population of "shufflant" cells; (3) selecting or screening from the population of host cells a subpopulation which expresses a starch synthase activity that comprises a catalytic kinetic parameter (s) (e.g., Km, Vmax, Ki) for one or more substrate(s), wherein the catalytic kinetic parameter(s) is at least one-half logarithm unit improved from the starch synthase that occurs naturally in the second taxonomic species, thereby forming a selected subpopulation; and (4) recovering shufflant polynucleotide sequence(s) from the selected subpopulation and subjecting them to one or more recursions of shuffling and selection until a shufflant encoding a novel starch synthase having the desired starch metabolism phenotype is obtained.

This method of interspecies adaptation may also be used to adapt any NSME selected shufflant, and optionally its operably linked control sequences, to a host cell taxonomic species different from that in which the NMSE was originally generated and selected.

ARTIFICIAL EVOLUTION METHODS FOR PRODUCTION OF NSME

The foregoing has described novel starch metabolizing enzymes useful for improving the starch producing phenotypes of various agricultural and commercial plant and microbial species. The present invention provides methods for artificially evolving these enzymes, enzymatic pathways and organisms, to optimize the production of the desired product, or intermediates. This is achieved by various directed evolution techniques known in the art, including DNA shuffling ("sequence shuffling," or simply "shuffling") as described by the authors and their coworkers The following publications describe a variety of recursive recombination procedures and/or methods which can be incorporated into such procedures: Stemmer, et al., (1999) "Molecular breeding of viruses for targeting and other clinical properties". *Tumor Targeting* 4: 1; Ness et al. (1999) "DNA Shuffling of subgenomic sequences of subtilisin" *Nature Biotechnology* 17:893; Chang et al. (1999) "Evolution of a cytokine using DNA family shuffling" *Nature Biotechnology* 17:793; Minshull and Stemmer (1999) "Protein evolution by molecular breeding" *Current Opinion in Chemical Biology* 3:284; Christians et al. (1 999) "Directed evolution of thymidine kinase for AZT phosphorylation using DNA family shuffling" *Nature Biotechnology* 17:259; Crameri et al. (1998) "DNA shuffling of a family of genes from diverse species accelerates directed evolution" *Nature* 391:288; Crameri et al. (1997) "Molecular evolution of an arsenate detoxification pathway by DNA shuffling," *Nature Biotechnology* 15:436; Zhang et al. (1997) "Directed evolution of an effective fucosidase from a galactosidase by DNA shuffling and screening" *Proceedings of the National Academy of Sciences. U.S.A.* 94:4504; Patten et al. (1997) "Applications of DNA Shuffling to Pharmaceuticals and Vaccines" *Current Opinion in Biotechnology* 8:724; Crameri et al. (1996) "Construction and evolution of antibody-phage libraries by DNA shuffling" *Nature Medicine* 2: 100; Crameri et al. (1996) "Improved green fluorescent protein by molecular evolution using DNA shuffling" *Nature Biotechnology* 14:315; Gates et al. (1996) "Affinity selective isolation of ligands from peptide libraries through display on a lac repressor 'headpiece dimer'" *Journal of Molecular Biology* 255:373; Stemmer (1996) "Sexual PCR and Assembly PCR" In: *The Encyclopedia of Molecular Biology*. VCH Publishers, New York. pp.447–457; Crameri and Stemmer (1995) "Combinatorial multiple cassette mutagenesis creates all the permutations of mutant and wildtype cassettes" *BioTechniques* 18: 194; Stemmer et al., (1995) "Single-step assembly of a gene and entire plasmid form large numbers of oligodeoxyribonucleotides" *Gene*, 164:49; Stemmer (1995) "The Evolution of Molecular Computation" *Science* 270: 1510; Stemmer (1 995) "Searching Sequence Space" *Bio/Technology* 13:549; Stemmer (1994) "Rapid evolution of a protein in vitro by DNA shuffling" *Nature* 370:389; and Stemmer (1994) "DNA shuffling by random fragmentation and reassembly: In vitro recombination for molecular evolution." *Proceedings of the National Academy of Sciences. U.S.A.* 91:10747.

Additional details regarding DNA shuffling methods are found in U.S. Patents by the inventors and their co-workers, including: U.S. Pat. No. 5,605,793 to Stemmer (Feb. 25, 1997), "METHODS FOR IN VITRO RECOMBINATION;" U.S. Pat. 5,811,238 to Stemmer et al. (Sep. 22, 1998) "METHODS FOR GENERATING POLYNUCLEOTIDES HAVING DESIRED CHARACTERISTICS BY ITERATIVE SELECTION AND RECOMBINATION;" U.S. Pat. No. 5,830,721 to Stemmer et al. (Nov. 3, 1998), "DNA MUTAGENESIS BY RANDOM FRAGMENTATION AND REASSEMBLY;" U.S. Pat. Nos. 5,834,252 and 5,928,905 to Stemmer, et al. (Nov. 10, 1998 and Jul. 27, 1999, respectively) "END-COMPLEMENTARY POLYMERASE REACTION," and U.S. Pat. No. 5,837,458 to Minshull, et al. (Nov. 17, 1998), "METHODS AND COMPOSITIONS FOR CELLULAR AND METABOLIC ENGINEERING."

In addition, details and formats for DNA shuffling are found in a variety of PCT and foreign patent application publications, including: Stemmer and Crameri, "DNA MUTAGENESIS BY RANDOM FRAGMENTATION AND REASSEMBLY" WO 95/22625; Stemmer and Lipschutz "END COMPLEMENTARY POLYMERASE CHAIN REACTION" WO 96/33207; Stemmer and Crameri "METHODS FOR GENERATING POLYNUCLEOTIDES HAVING DESIRED CHARACTERISTICS BY ITERATIVE SELECTION AND RECOMBINATION" WO 97/20078; Minshull and Stemmer, "METHODS AND COMPOSITIONS FOR CELLULAR AND METABOLIC ENGINEERING" WO 97/35966; Punnonen et al. "TARGETING OF GENETIC VACCINE VECTORS" WO 99/41402; Punnonen et al. "ANTIGEN LIBRARY IMMUNIZATION" WO 99/41383; Punnonen et al. "GENETIC VACCINE VECTOR ENGINEERING" WO 99/41369; Punnonen et al. OPTIMIZATION OF IMMUNOMODULATORY PROPERTIES OF GENETIC VACCINES WO 99/41368; Stemmer and Crameri, "DNA MUTAGENESIS BY RANDOM FRAGMENTATION AND REASSEMBLY" EP 0934999; Stemmer "EVOLVING CELLULAR DNA UPTAKE BY RECURSIVE SEQUENCE RECOMBINATION" EP 0932670; Stemmer et al., "MODIFICATION OF VIRUS TROPISM AND HOST RANGE BY VIRAL GENOME SHUFFLING" WO 99/23107; Apt et al., "HUMAN PAPILLOMAVIRUS VECTORS" WO 99/21979; Del Cardayre et al. "EVOLUTION OF WHOLE CELLS AND ORGANISMS BY RECURSIVE SEQUENCE RECOMBINATION" WO 98/31837; Patten and Stemmer, "METHODS AND COMPOSITIONS FOR POLYPEPTIDE ENGINEERING" WO 98/27230; Stemmer et al., and "METHODS FOR OPTIMIZATION OF GENE THERAPY BY RECURSIVE SEQUENCE SHUFFLING AND SELECTION" WO 98/13485 and WO 98/13487.

Certain U.S. Applications provide additional details regarding DNA shuffling and related techniques, including "METHODS AND COMPOSITIONS FOR POLYPEPTIDE ENGINEERING" BY Patten et al. filed Dec. 18, 1996 (USSN 08/769,062), "MODIFIED RIBULOSE 1,5-BISPHOSPHATE CARBOXYLASE/ OXYGENASE FOR IMPROVEMENT AND OPTIMIZATION OF PLANT PHENOTYPES" by Stemmer et al. filed Nov. 10, 1998 (USSN 60/107,756), "MODIFIED ADP-GLUCOSE PYROPHSOPHORYLASE FOR IMPROVEMENT AND OPTIMIZATION OF PLANT PHENOTYPES" by Stemmer and Subramanian, filed Nov. 10, 1998 (USSN 60/107,782) "SHUFFLING OF CODON ALTERED GENES" by Patten et al. filed Sep. 29, 1998, (USSN 60/102,362), Jan. 29, 1999 (USSN 60/117,729), and Sep. 28, 1999, (USSN 09/407, 800); "EVOLUTION OF WHOLE CELLS AND ORGANISMS BY RECURSIVE SEQUENCE RECOMBINATION", by Del Cardayre et al. filed Jul. 15, 1998 (USSN 09/166,188), and Jul. 15, 1999 (USSN 09/354, 922); "OLIGONUCLEOTIDE MEDIATED NUCLEIC ACID RECOMBINATION" by Crameri et al., filed Feb. 5, 1999 (USSN 60/118,813) and filed Jun. 24, 1999 (USSN 60/141,049) and filed Sep. 28, 1999 (USSN 09/408,392); and "USE OF CODON-BASED OLIGONUCLEOTIDE SYNTHESIS FOR SYNTHETIC SHUFFLING" by Welch et al., filed Sep. 28, 1999 (USSN 09/408,393); "METHODS FOR MAKING CHARACTER STRINGS, POLYNUCLEOTIDES & POLYPEPTIDES HAVING DESIRED CHARACTERISTICS" by Selifonov and Stemmer, filed Feb. 5, 1999 (USSN 60/118854); "SINGLE-STRANDED NUCLEIC ACID TEMPLATE-MEDIATED RECOMBINATION AND NUCLEIC ACID FRAGMENT ISOLATION" by Affholter, filed Mar. 2, 2000 (USSN 60/186482); "METHOD FOR GENERATION OF RECOMBINANT DNA MOLECULES IN COMPLEX MIXTURES WITHOUT CLONING" by Carr et al. filed Mar. 20, 2000 (USSN 60/190774); "INTEGRATED SYSTEMS AND METHODS FOR DIVERSITY GENERATION AND SCREENING" by Bass et al. filed Jan. 11, 2000 (USSN 60/175551); and "EVOLVING EPISOMES AS A MEANS TO CONTROL COMPLEX CHROMOSOMAL PHENOTYPES" by Stemmer et al. filed Mar. 24, 2000 (Attorney Docket Number 02-1047).

As review of the foregoing publications, patents, published applications and U.S. patent applications reveals, shuffling (or recursive recombination) of nucleic acids to provide new nucleic acids with desired properties can be carried out by a number of established methods. Any of these methods can be adapted to the present invention to evolve and/or optimize novel starch metabolizing enzymes.

In brief, at least 5 different general classes of recombination methods are applicable to the present invention. First, nucleic acids comprising genes encoding starch metabolizing enzymes can be recombined in vitro by any of a variety of techniques discussed in the references above, including e.g., DNAse digestion of nucleic acids to be recombined followed by ligation and/or PCR reassembly of the nucleic acids; shuffling using single stranded template as affinity capture elements (see, USSN 60/186,482). Second, nucleic acids can be recursively recombined in vivo, e.g., by allowing recombination to occur between exogenous and/or endogenous sequences encoding the enzymes of the invention, e.g., plasmids, nucleic acids in cells. Third, whole cell genome recombination methods can be used in which whole genomes of cells (e.g., bacterial, yeast or fungal cells) are recombined, optionally including spiking of the genomic recombination mixtures with desired components such as genes encoding specific plant, bacterial or fungal starch metabolizing enzymes, or subfragments thereof. Fourth, synthetic recombination methods can be used, in which oligonucleotides corresponding to different enzyme encoding genes are synthesized and reassembled in PCR and/or ligation reactions which include oligonucleotides which correspond to more than one parental starch metabolizing enzyme nucleic acid, thereby generating new recombined NSME nucleic acids. Oligonucleotides can be made by standard nucleotide addition methods, or can be made by tri-nucleotide synthetic approaches. Fifth, in silico methods of recombination can be effected in which genetic algorithms are used in a computer to recombine sequence strings which correspond to specific starch metabolizing enzyme gene sequences. The resulting recombined sequence strings are optionally converted into recombined nucleic acids by synthesis of nucleic acids which correspond to the recombined sequences, e.g., in concert with oligonucleotide synthesis/gene reassembly techniquesto produce NSMEs. Any of the preceding general recombination formats can be practiced in a reiterative fashion to generate a more diverse set of recombinant nucleic acids.

The above references provide these and other basic recombination formats as well as many modifications of these formats. Regardless of the format which is used, the nucleic acids of the invention can be recombined with each other or with related (or even unrelated) nucleic acids to produce a diverse set of recombinant nucleic acids, including homologous nucleic acids. Following recombination, any nucleic acids which are produced can be selected for a desired activity. Such characteristics can be any property or attribute capable of being selected for or detected in a screening system, and may include properties of: an encoded protein, a transcriptional element, a sequence controlling transcription, RNA processing, RNA stability, chromatin conformation, translation, or other expression property of a gene or transgene, a replicative element, a protein-binding element, or the like, such as any feature which confers a selectable or detectable property. In the context of the present invention, this can include testing for production of starch or a metabolic intermediate by any of the assays known in the art.

A recombinant nucleic acid produced by recursively recombining one or more polynucleotide of the invention with one or more additional nucleic acid also forms a part of the invention. The one or more additional nucleic acid may include another polynucleotide of the invention; optionally, alternatively, or in addition, the one or more additional nucleic acid can include, e.g., a nucleic acid encoding a naturally-occurring starch metabolizing enzyme, or a subsequence thereof, or any homologous sequence or subsequence thereof, (e.g., as found in Genbank or other available literature, or newly identified), or, e.g., any other homologous or non-homologous nucleic acid (certain recombination formats noted above, notably those performed synthetically or in silico, or utilizing cre-lox recombination or similar systems, do not require homology for recombination).

The recombining steps can be performed in vivo, in vitro, or in silico, or a combination thereof, as described in more detail in the references above. Automated method for performing recombination and screening are described, e.g., in USSN 60/175551.

Also included in the invention is a cell containing any resulting recombinant nucleic acid, nucleic acid libraries produced by recursive recombination of the nucleic acids set forth herein, and populations of cells, vectors, viruses, plasmids or the like comprising the library or comprising any recombinant nucleic acid resulting from recombination (or recursive recombination) of a nucleic acid as set forth herein with another such nucleic acid, or an additional nucleic acid. Corresponding sequence strings in a database present in a computer system or computer readable medium are a feature of the invention.

To maximize the probability of recovering beneficial recombinants, e.g., with desirable enzymatic activities or other desirable properties, several variations of DNA shuffling can be compared. Such variations include (a) shuffling of only positive clones (low-diversity shuffling), (b) shuffling of positive clones with all clones from the parent library (high-diversity shuffling), (c) shuffling of positive clones with other members of homologous or related enzyme families (family shuffling), especially, e.g., where added functionality is desirable (e.g., in providing enzymes with unique functions such as the ability to catalyze multi-step reaction pathways) (d) spiking the shuffling reaction with oligos encoding, e.g., particular catalytic or other structural domains, (e) serial passage of shuffled clones through an *E. Coli* mutator strain (e.g. *E. coli* mutD5), (f) shuffling of clones derived from a second functionally related library, or (g) any combination of the above.

For the purposes of the present invention, the above methodologies either singly or in combination are used to evolve and optimize enzymes and pathways which convert glucose or another sugar or sugar derivative to starch. The methods of the invention are adapted to each application through the choice of substrates and the methods of screening or selection. For example, enzymes with increased conversion rates or altered substrate specificity can be selected by monitoring production of a specified product or intermediate, by any technique known in the art Alternatively, in vitro techniques based on the characteristics of polynucleotides, such as PCR, LCR, nucleic acid hybridization analysis, or on the characteristics of proteins, e.g. western hybridization, proteomics, are the method of choice in some instances.

DNA shuffling provides a robust, widely applicable means of generating diversity useful for the engineering of proteins, pathways, cells and organisms with improved characteristics. A variety of shuffling and other diversity generating methods can be practiced separately, or together, and the results (i.e., diverse populations of nucleic acids encoding enzymes) screened for in the methods of the invention. In addition to the references above, diversity can be introduced by methods which result in the alteration of individual nucleotides or groups of contiguous or non-contiguous nucleotides, i.e., mutagenesis methods. Mutagenesis methods include, for example, recombination (PCT/US98/05223; Publ. No. WO98/42727); oligonucleotide-directed mutagenesis (for review see, Smith (1985) *Ann Rev Genet* 19: 423; Botstein and Shortle, *Science* (1985) 229: 1193; Carter (1986) *Biochem J* 237: 1; Kunkel (1987) "The efficiency of oligonucleotide directed mutagenesis" in *Nucleic acids & Molecular Biology*, Eckstein and Lilley (eds.) Springer Verlag, Berlin). Included among these methods are oligonucleotide-directed mutagenesis (Zoller and Smith (1982) *Nucl Acids Res* 10:6487, (1983) *Methods in Enzymol* 100:468, and (1987) *Methods in Enzymol* 154:329) phosphothioate-modified DNA mutagenesis (Taylor et al. (1985) *Nucl Acids Res* 13:8749; Taylor et al. (1985) *Nucl Acids Res* 13:8765; Nakamaye and Eckstein (1986) *Nucl Acids Res* 14:9679; Sayers et al. (1988) *Nucl Acids Res* 16:791; Sayers et al. (1988) *Nucl Acids Res* 16:803), mutagenesis using uracil-containing templates (Kunkel (1985) *Proc Natl Acad Sci USA* 82:488 and Kunkel et al. *Methods in Enzymol* 154:367); mutagenesis using gapped duplex DNA (Kramer et al. (1984) *Nucl Acids Res* 12:9441; Kramer and Fritz (1987) *Methods in Enzymol* 154:350; Kramer et al. (1988) *Nucl Acids Res* 16:7207); and Fritz et al. (1988) *Nucl Acids Res* 16:6987). Additional suitable methods include point mismatch repair (Kramer et al. (1984) *Cell* 38:879), mutagenesis using repair-deficient host strains (Carter et al. (1985) *Nucl Acids Res* 13:4431; Carter (1987) *Methods in Enzymol* 154:382), deletion mutagenesis (Eghtedarzadeh and Henikoff(1986) *Nucl Acids Res* 14:5115), restriction-selection and restriction-purification (Wells et al. (1986) *Phil Trans R Soc Lond* 317:415), mutagenesis by total gene synthesis (Nambiar et al. (1984) *Science* 223: 1299; Sakamar and Khorana (1988) *Nucl Acids Res* 14:6361; Wells et al. (1985) *Gene* 34:315; and Grundstrom et al. (1985) *Nucl Acids Res* 13:3305. Kits for mutagenesis are commercially available (e.g., Bio-Rad, Amersham International, Anglian Biotechnology).

Other proposed methods of generating diversity in biologic molecules include the stochastic generation of polynucleotide sequences, (Kauffman and Ballivet U.S. Pat. Nos. 5,723,323; 5,763,192; 5,814,476; 5,817,483; and 5,824,514). Techniques have been developed which produce chimeric nucleic acid multimers suitable for transformation into a variety of species, including *E. coli* and *B. subtilis* (see e.g., Schelienberger U.S. Pat. No. 5,756,316). It has also been proposed (U.S. Pat. No. 5,965,408) that diversity can be introduced into a population of polynucleotides via synthesis in the presence of a chain terminating reagent.

Diversity can be further increased by combining methods which are not homology based with DNA shuffling. For example, incremental truncation for the creation of hybrid enzymes (ITCHY) described in Ostermeier et al. (1999) "A combinatorial approach to hybrid enzymes independent of DNA homology" *Nature Biotech* 17:1205, can be used to generate an initial recombinant library which can serve as additional substrates in the methods of the invention.

Methods for generating multispecies expression libraries have been described (e.g., U.S. Pat. Nos. 5,783,431; 5,824,485) and their use to identify protein activities of interest has been proposed (U.S. Pat. No. 5,958,672).

The libraries produced by the methods of the present invention can be biased towards nucleic acids which encode proteins with desirable enzyme activities. For example, after identifying a clone from a library produced by the methods of the present invention which exhibits a specified activity, the clone can be mutagenized using any known method for introducing DNA alterations, including, but not restricted to, DNA shuffling. A library comprising the mutagenized homologues is then screened for a desired activity, which can be the same as or different from the initially specified activity. An example of such a procedure is proposed in U.S. Pat. No. 5,939,250. Desired activities can be identified by any method known in the art. For example, WO 99/10539 proposes that gene libraries can be screened by combining extracts from the gene library with components obtained from metabolically rich cells and identifying combinations which exhibit the desired activity. It has also been proposed (e.g., WO 98/58085) that clones with desired activities can be identified by inserting bioactive substrates into samples of the library, and detecting bioactive fluorescence corresponding to the product of a desired activity using a fluorescent analyzer, e.g., a flow cytometry device, a CCD, a fluorometer, or a spectrophotometer. Libraries can also be biased towards nucleic acids which have specified characteristics, e.g., hybridization to a selected nucleic acid probe. For example, application WO 99/10539 proposes such procedures.

ASSAY TECHNOLOGY FOR IMPROVING STARCH METABOLIZING ENZYMES

Given the recursive nature of the evolutionary techniques described above, and the need to screen large libraries of gene variants obtained by the mutagenesis of molecular breeding, i.e., DNA shuffling, protocols, it is important to use effective methods to measure desired function and to detect improved variants producing the desired reaction products.

There are various selectable properties for which the biocatalysts of the present invention can be evolved, including assorted kinetic constants, stability, selectivity, inhibition profiles, altered substrate specificity, increased activity, increased gene expression, activity under diverse environmental conditions (i.e., temperature, growth medium, pH, etc.), and the like. Generally, one or more recombination cycle(s) is/are optionally followed by at least one cycle of selection for molecules having one or more of these or other desired traits or properties.

If a recombination cycle is performed in vitro, the products of recombination, i.e., recombinant or shuffled nucleic acids, are sometimes introduced into cells before the selection step. Recombinant nucleic acids can also be linked to an appropriate vector or to other regulatory sequences before selection. Alternatively, products of recombination generated in vitro are sometimes packaged in viruses (e.g., bacteriophage) before selection. If recombination is performed in vivo, recombination products may sometimes be selected in the cells in which recombination occurred. In other applications, recombinant segments are extracted from the cells, and optionally packaged as viruses or other vectors, before selection.

The nature of selection depends on what trait or property is to be acquired or for which improvement is sought. It is not usually necessary to understand the molecular basis by which particular recombination products have acquired new or improved traits or properties relative to the starting substrates. For instance, a gene has many component sequences, each having a different intended role (e.g., coding sequences, regulatory sequences, targeting sequences, stability-conferring sequences, subunit sequences and sequences affecting integration). Each of these component sequences are optionally varied and recombined simultaneously. Selection is then performed, for example, for recombinant products that have an increased ability to confer improved starch metabolizing activity upon a cell without the need to attribute such improvement to any of the individual component sequences of the vector.

Depending on the particular protocol used to select for a desired trait or property, initial round(s) of screening can sometimes be performed using bacterial cells due to high transfection efficiencies and ease of culture. However, yeast, fungal, plant or other eukaryotic systems may also be used for library expression and screening when bacterial expression is not practical or desired. Similarly, other types of selection that are not amenable to screening in bacterial or simple eukaryotic library cells, are performed in cells selected for use in an environment close to that of their intended use. Final rounds of screening are optionally performed in the precise cell type of intended use.

When further improvement in a trait is sought, at least one and usually a collection of recombinant products surviving a first round of screening/selection are optionally subject to a further round of recombination. These recombinant products can be recombined with each other or with exogenous segments representing the original substrates or further variants thereof. Again, recombination can proceed in vitro or in vivo. If the previous screening step identifies desired recombinant products as components of cells, the components can be subjected to further recombination in vivo, or can be subjected to further recombination in vitro, or can be isolated before performing a round of in vitro recombination. Conversely, if the previous selection step identifies desired recombinant products in naked form or as components of viruses, these segments can be introduced into cells to perform a round of in vivo recombination. The second round of recombination, irrespective how performed, generates additionally recombined products which encompass more diversity than is present in recombinant products resulting from previous rounds.

The second round of recombination may be followed by still further rounds of screening/selection according to the principles discussed for the first round. The stringency of selection can be increased between rounds. Also, the nature of the screen and the trait or property being selected may be varied between rounds if improvement in more than one trait or property is sought. Additional rounds of recombination and screening can then be performed until the recombinant products have sufficiently evolved to acquire the desired new or improved trait or property.

Multiple cycles of recombination can be performed to increase library diversity a before a round of selection is performed. Alternately, where the library is diverse, multiple rounds of selection can be performed prior to recombination methods.

Numerous methods for selecting enzymes with desirable traits are available. Most frequently, these methods detect absolute or relative amounts of metabolites of interest. These include mass spectroscopy, nuclear magnetic resonance spectroscopy, chromatography and many other techniques which can be used to account for a physical difference between the desired product (e.g., starch or an intermediate metabolite) and other compounds present in the analyzed medium.

In the present invention, any one or a combination of the described methods are directed towards generating a selected polynucleotide sequence (e.g., a plant NSME gene or microbe NSME gene, or combinations thereof) or population of selected polynucleotide sequences, typically in the form of amplified and/or cloned polynucleotides, whereby the selected polynucleotide sequence(s) possess a desired phenotypic characteristic of an NSME or a subunit thereof which can be selected for, and whereby the selected polynucleotide sequences are genetic sequences having a desired functionality and/or conferring a desired phenotypic property to an agricultural organism in which the polynucleotide has been transferred into.

In a general aspect, the invention provides a means for generating libraries of recombinant polynucleotides having a subpopulation of library members which encode an enhanced or improved NSME protein. Libraries of recombinant polynucleotides are generated from a population of related or unrelated polynucleotides encoding starch metabolizing enzymes, or subunits or fragments thereof, which can be homologously or non-homologously recombined as described above. At least two species of starch metabolizing enzyme encoding polynucleotides are combined in a recombination system suitable for generating sequence-recombined polynucleotides, wherein said sequence-recombined polynucleotides comprise a portion of at least one first species of a related-sequence NSME polynucleotide with at least one adjacent portion of at least one second species of a related-sequence NSME polynucleotide. Recombination systems suitable for generating sequence-recombined polynucleotides can be either any one or a combination of the systems described in this or any of the documents incorporated herein by reference.

The population of sequence-recombined polynucleotides comprises a subpopulation of NSME polynucleotides which possess desired or advantageous enzymatic characteristics and which can be selected by a suitable selection or screening method. The selected sequence-recombined NSME polynucleotides can then be subjected to at least one recursive cycle wherein at least one selected sequence-recombined NSME polynucleotide is combined with at least one distinct species of related-sequence NSME polynucleotide (which may itself be a selected sequence-recombined polynucleotide) in a recombination system suitable for generating sequence-recombined NSME polynucleotides, such that additional generations of sequence-recombined polynucleotide sequences are generated from the selected sequence-recombined polynucleotides obtained by the selection or screening method employed. In this manner, recursive sequence recombination generates library members which are sequence-recombined polynucleotides possessing desired NSME enzymatic characteristics. Such characteristics can be any property or attribute capable of being selected for or detected in a screening system.

Screening/selection produces a subpopulation of genetic sequences (or cells) expressing recombinant forms of NSME gene(s) that have evolved toward acquisition of a desired enzymatic property. These recombinant forms can then be subjected to further rounds of recombination and screening/selection in any order. For example, a second round of screening/selection can be performed analogous to the first resulting in greater enrichment for genes having evolved toward acquisition of the desired enzymatic property. Optionally, the stringency of selection can be increased between rounds (e.g., if selecting for drug resistance, the concentration of drug in the media can be increased). Further rounds of recombination can also be performed by an analogous strategy to the first round generating further recombinant forms of the gene(s) or genome(s). Alternatively, further rounds of recombination can be performed by any of the other molecular breeding formats discussed. Eventually, a recombinant form of the NSME gene(s) is generated that has fully acquired the desired enzymatic property.

In an embodiment, the first plurality of selected library members is fragmented and homologously recombined by PCR in vitro. Fragment generation is by nuclease digestion, partial extension PCR amplification, PCR stuttering, or other suitable fragmenting means, such as described herein and in W095/22625 published Aug. 24, 1995, and in commonly owned U.S.S.N. U.S.S.N. 08/621,859 filed 25 Mar. 1996, PCT/US96/05480 filed 18 Apr. 1996, which are incorporated herein by reference). Stuttering is fragmentation by incomplete polymerase extension of templates. A recombination format based on very short PCR extension times can be employed to create partial PCR products, which continue to extend off a different template in the next (and subsequent) cycle(s), and effect de facto fragmentation. Template-switching and other formats which accomplish sequence shuffling between a plurality of sequence-related polynucleotides can be used. Such alternative formats will be apparent to those skilled in the art.

In one embodiment, the first plurality of selected library members is fragmented in vitro, the resultant fragments transferred into a host cell or organism and homologously recombined to form shuffled library members in vivo. In an aspect, the host cell is a plant cell which has been engineered to contain enhanced recombination systems, such as an enhanced system for general homologous recombination (e.g., a plant expressing a recA protein or a plant recombinase from a transgene or plant virus) or a site-specific recombination system (e.g., a cre/LOX or frt/FLP system encoded on a transgene or plant virus).

In one embodiment, the first plurality of selected library members is cloned or amplified on episomally replicable vectors, a multiplicity of said vectors is transferred into a cell and homologously recombined to form shuffled library members in vivo in a plant cell, algae cell, or bacterial cell. Other cell types may be used, if desired.

In one embodiment, the first plurality of selected library members is not fragmented, but is cloned or amplified on an episomally replicable vector as a direct repeat or indirect (or inverted) repeat, which each repeat comprising a distinct species of selected library member sequence, said vector is transferred into a cell and homologously recombined by intra-vector or inter-vector recombination to form shuffled library members in vivo in a plant cell, algae cell, or microorganism.

In an embodiment, combinations of in vitro and in vivo shuffling are provided to enhance combinatorial diversity. The recombination cycles (in vitro or in vivo) can be performed in any order desired by the practitioner.

Without reciting the various generalized formats of polynucleotide sequence shuffling and selection described previously or hereinbelow, which will be referred to herein by the shorthand "shuffling", the present invention provides methods, compositions, and uses related to creating novel or improved plants, plant cells, algal cells, soil microbes, plant pathogens, commensal microbes, or other plant-related organisms having art-recognized importance to the agricultural, horticultural, and argonomic areas (collectively, "agricultural organisms").

In certain variations, naturally occurring in vivo recombination mechanisms of plants, agricultural microorganisms, or vector-host cells for intermediate replication can be used in conjunction with a collection of shuffled polynucleotide sequence variants having a desired phenotypic property to be optimized further; in this way, a natural recombination mechanism can be combined with intelligent selection of variants in an iterative manner to produce optimized variants by "forced evolution", wherein the forced evolved variants are not expected to, nor are observed to, occur in nature, nor are predicted to occur at an appreciable frequency. The practitioner may further elect to supplement and/or the mutational drift by introducing intentionally mutated polynucleotide species suitable for shuffling, or portions thereof, into the pool of initial polynucleotide species and/or into the plurality of selected, shuffled polynucleotide species which are to be recombined. Mutational drift may also be supplemented by the use of mutagens (e.g., chemical mutagens or mutagenic irradiation), or by employing replication conditions which enhance the mutation rate.

For example, a NSME that has an improved starch synthase activity is obtained according to the present invention by performing recursive polynucleotide sequence shuffling on at least one naturally-occurring starch synthase or glycogen synthase gene with at least one additional (typically sequence-related) polynucleotide to form a library of shufflants, transferring, into host cells, the shufflants, in expressible form, generally including a suitable fused sequence encoding a chloroplast or amyloplast transit peptide sequence (if expression in plant cells is desired), and appropriate transcriptional and translational control sequences, hereby forming a population of shufflant-expressing host cells and/or their progeny, and selecting from said population of shufflant-expressing host cells or their progeny a subpopulation, comprising at least one cell, having a protein exhibiting a starch synthase catalytic activity having a statistically significant detectable improvement wherein the Km for ADP-glucose or for a derivatized glucose substrate (ADP-glucose-6-amine, ADP-glucose-6-aldehyde, ADP-glucose-6-carboxylic acid, ADP-glucose-2-amine, UDP-glucose-6-amine, alternatively derivatized position 2 or position 6 NDP-glucose analogs, and the like) is significantly lower than in a protein encoded by a parental polynucleotide encoding a naturally-occurring starch synthase enzyme, recovering the shufflant polynucleotide sequence(s) from said subpopulation, and subjecting the recovered shufflant polynucleotide sequence(s) to at least one subsequent round of shuffling and selection for the desired starch metabolic phenotype; said desired starch metabolic phenotype typically being, in this embodiment, enhanced incorporation into starches of ADP-glucose or one and/or more derivatized glucose substrate (i.e., monomer units which comprise reactive substituents at position 2 or 6 of the glucosyl moiety - such as a ADP-glucose-6-amine, ADP-glucose-6-aldehyde, ADP-glucose-2-amine, and the like).

SELECTION OF SHUFFLED POLYNUCLEOTIDE SEQUENCES

A variety of selection and screening methods will be apparent to those skilled in the art, and will depend upon the particular phenotypic properties that are desired. The selected shuffled genetic sequences can be recovered for further shuffling or for direct use by any applicable method, including but not limited to: recovery of DNA, RNA, or cDNA from cells (or PCR-amplified copies thereof) from cells or medium, recovery of sequences from host chromosomal DNA or PCR-amplified copies thereof, recovery of episome (e.g., expression vector) such as a plasmid, cosmid, viral vector, artificial chromosome, and the like, or other suitable recovery method known in the art. Any suitable art-known method, including RT-PCR or PCR, can be used to obtain the selected shufflant sequence(s) for subsequent manipulation including shuffling and selection.

A variety of suitable host cells will be apparent to those skilled in the art. Of particular note, NSME gene shufflants can be expressed in deletion mutant strains of *E. coli*, as well as higher taxonomic host cells. In some cases, subunits from higher plants are not processed correctly in bacterial host cells, so higher plant gene shufflants are often expressed for phenotypic screening in plant cells, including mutant plant cell lines wherein an endogenous NSME encoding gene has been functionally inactivated, preferably in homozygous format, to provide a plant cell substantially lacking endogenous NSME activity, or the like.

In a variation, the sequence-shuffled polynucleotides operably linked to an expression sequence is also linked, in polynucleotide linkage, to an expression cassette encoding a selectable marker gene. Transformants are propagated on a selective medium to ensure that transformants which are assayed for NSME activity contain a sequence-shuffled NSME encoding sequence in expressible form. In embodiments wherein a polynucleotide encoding a bacterial NSME are to be introduced into host cells which possess plastids, the NSME encoding sequence is generally operably linked to a transport sequence to facilitate transport of the translated gene product into the plastid. Optionally, a transcriptional regulatory sequence functional in chloroplasts or amyloplasts may be used and the resultant expression cassette is transferred into the host cell plastids, such as by biolistics, polyethylene glycol (PEG) treatment of protoplasts, or an other suitable method.

In a variation, the above-described method is modified such that NSME activity is assayed in the presence of varying concentrations of substrate and the Km for substrate is determined. Each vessel containing an aliquot of a transformant is assayed for NSME activity in the presence of a predetermined concentration of substrate which ranges from about 0.0001 times the predetermined Km for substrate of the NSME encoded by the parental polynucleotide(s) to about 10,000 times the predetermined Km for substrate of the NSME encoded by the parental polynucleotide(s). From the data generated by assaying the plurality of reaction vessels containing aliquots of each transformant, a Km value is calculated by conventional art-known means for the sequence-shuffled NSME of each transformant. Sequence-shuffled polynucleotides encoding NSME proteins that have significantly increased Km values for substrate are selected and used as parental sequences for at least one additional round of sequence shuffling by any suitable method and selection for increased Km values for substrate. The shuffling and selection process is performed iteratively until sequence shuffled polynucleotides encoding at least one NSME enzyme having a desired Km value is obtained, or until the optimization to increase the Km has plateaued and no further improvement is seen in subsequent rounds of shuffling and selection.

In an embodiment of the method, the host cell for transformation with sequence-shuffled polynucleotides encoding NSME is a bacterial mutant which lacks a functional NSME protein, such as $E.\ coli$ glygogen$^{(-)}$ mutant or an equivalent. For such mutant host cells, transformants which express NSME activity and permit glycogen synthesis can be readily identified as colored colonies following exposure to iodine vapor. The color varies from blue to purple or brown, and from light to dark, depending on the amount of starch formed and with the composition (e.g., molecular weight, degree of branching, etc.) of the starch formed. In this variation, colored colonies identified after exposure to iodine vapor, or their replicate colonies, are selected and assayed in vitro to determine whether, relative to a parental NSME assayed under equivalent conditions, the Km for a given substrate is decreased and/or the Vmax is increased for each shufflant transformant; transformants which exhibit an decreased Km and/or a increased Vmax are selected and used for at least one subsequent round of sequence shuffling and NSME enzymatic phenotype selection.

In an embodiment of the method, polynucleotides encoding naturally-occurring NSME protein sequences of a plurality of species of photosynthetic prokaryotes and/or algae and/or higher plants are shuffled by a suitable shuffling method to generate a shuffled NSME polynucleotide library, wherein each shuffled NSME encoding sequence is operably linked to an expression sequence, and which may optionally comprise a linked selectable marker gene cassette. Said library is transformed into a host cell population, such as bacteria which lack endogenous NSME activity, to form a transformed host cell library. The transformed host cell library is propagated on growth medium, which may contain a selection agent to ensure retention of a linked selectable marker gene. The transformed host cell library is subjected to selection by incubating the cells under a graded range of concentrations of iodine vapor and selecting blue colonies, preferentially those having the deepest coloration of blue. Transformed host cells which are screened for under the most stringent conditions are isolated individually or in pools, and the sequence-shuffled polynucleotide sequences encoding NSME are recovered, and optionally subjected to at least one subsequent iteration of shuffling and selection on growth medium, optionally using lower ranges of iodine vapor pressure (or exposure times) to identify blue colonies. The recovered sequence-shuffled NSME polynucleotide(s) encode(s) an enhanced NSME protein.

SELECTION IN A MODIFIED BACTERIAL STARCH SYNTHESIS SYSTEM

The invention provides modified bacterial cells suitable as host cells for screening and selection of shuffled polynucleotides encoding starch synthase (or glycogen synthase), or ADP-glucose pryophosphorylase, wherein these enzyme activities are altered with regard to substrate usage. The modified bacterial host cells are generally $E.\ coli$ or the like, which have inactivating mutations (e.g., deletions, frameshifts, artificial stop codon, etc.) of the glgC gene, and optionally also the phosphoglucomutase (pgm) gene, such that the modified host cell substantially will not synthesize glycogen when grown on medium containing glucose, galactose, or glucosamine as the carbon source. In addition, a mutation in the nagB gene (beta-N-acetylglucosaminidase) is often advantageous to prevent the conversion of glucosamine to cellular constituents other than glycogen, lipid A, O-antigen and peptidoglycan.

Such a modified bacterial host cell is a suitable host for expression and screening of introduced expressible shufflant polynucleotides encoding novel glycogen synthase species and/or novel ADP-glucose pyrophosphorylase species, such as a library of sequence shuffled glgC gene sequences. The transformed host cells are used to screen for novel glycogen synthase or ADP-glucose pyrophosphorylase protein species that can utilize glucosamine and/or derivatized glucosamine analogs (or their metabolites glucosamine-6-P or glucosamine-1-P) as substrates for converting to ADP-glucosamine (or glucosamine-1-P or glucosamine-6-P) or derivatized analogs thereof comprising reactive substituents (e.g., amines, carboxylates, aldehydes, carbonyls) at non-interfering positions (i.e., that do not substantially interfere with incorporation into starches); the ADP-glucosamine (or reactive analog thereof) may then be used as a substrate by the glgA enzyme (glycogen synthase) to incorporate ADP-glucosamine (or analogs thereof) into glycogen. In a variation, modified bacterial host cells substantially lacking endogenous glgC gene function, and optionally also substantially lacking pgm gene function, are employed as host cells to select shufflants of the glgC gene which encode ADP-glucosamine pyrophosphorylase shufflants having enzyme activity at least 1 log unit greater than the naturally occurring glgC gene for catalyzing formation of ADP-glucosamine from glucosamine and ATP (i.e., the glgC protein is transformed from a ADP-glucose pyrophosphorylase into a more promiscuous enzyme capable of efficient usage of glucosamine-1-P as a substrate for forming ADP-glucosamine). The generated ADP-glucosamine may subsequently be incorporated into glycogen or starch by glycogen synthase or starch synthase, which may themselves be encoded by shufflant polynucleotides. Thus, this aspect of the invention provides novel ADP-glucose pyrophosphorylase enzymes which exhibit modified substrate usage wherein glucosamine is used as a phosphorylation substrate to form substantial amounts of ADP-glucosamine (or analogs thereof), which may then be used as a substrate monomer for incorporation into starches by a naturally-occurring starch synthase or glycogen synthase, or by a novel starch synthase or glycogen synthase which has been evolved by sequence shuffling and selection to exhibit at least a one log unit improvement in Vmax and/or a one log unit reduction in Km for incorporation of ADP-glucosamine or an analog thereof into starch.

In some embodiments, the modified bacterial cells optionally comprise an episome encoding an NSME having ADP-glucose pyrophosphorylase activity; and/or encoding an NSME having starch synthase or glycogen synthase activity. Such NSME encoding episomes typically comprise polynucleotides that have at least about 70%, frequently at least about 80%, sometimes at least about 90%, and occasionally 95% or more, sequence identity to a naturally-occuring starch metabolizing enzyme of a plant, algae, bacterium, or animal species. Such bacterial host cells are useful for identifying shufflant polynucleotides encoding proteins having ADP-glucose pyrophosphorylase that is promiscuous for the phosphorylation of glucosamine and glucosamine analogs, and subsequently for identifying shufflant sequences encoding starch synthase or glycogen synthase enzymes which can use ADP-glucosamine or analogs thereof for efficient incorporation into starch.

For example, novel proteins having ADP-glucosamine pyrophosphorylase activity can be identified and isolated by transferring a library of sequence shuffled polynucleotides encoding polypeptides having sequence similarity to an ADP-glucose pyrophosphorylase encoded by a naturally-occurring plant, algal, animal, or bacterial genome, in expressible form, into bacterial host cells lacking endogenous pgm and glgC gene function, thereby forming a population of transformed host cells. A subpopulation of transformed host cells which express a detectable ADP glucosamine pyrophosphorylase activity that is improved with respect to the most highly sequence identical ADP glucose pyrophosphorylase encoded by a genome of a naturally-occurring organism is identified by selecting or screening the population of transformed host cells.

A plurality of selected shuffled polynucleotides is recovered from the subpopulation, and at least one subsequent round of sequence shuffling is performed, until a selected shufflant encoding a ADP glucosamine pyrophosphorylase having a desired enzymatic phenotype is obtained. In some variations, the glgA bacterial gene (glycogen synthase) sequences are shuffled and selected for the capability to efficiently use ADP-glucosamine as a substrate for incorporation into starches.

In some embodiments, novel polynucleotides encoding proteins having substantial ADP glucosamine pyrophosphorylase catalytic activity, novel polynucleotides encoding proteins having substantial starch synthase and/or glycogen synthase catalytic activity, and expression constructs comprising these novel encoding sequences operably linked to transcriptional control sequences, and optionally plastid transit peptide encoding sequences are provided.

Typically, the method employs screening wherein the transformed modified host cells are grown on glucosamine-containing medium and selected for glycogen formation. Glycogen formation can be assayed in any suitable method, including iodine vapor staining or mass spectroscopy and other methods known in the art.

Mass spectroscopy is a generic method that allows detection of a large variety of different small molecule metabolites, including various sugars, starches and their intermediates. Tandem mass spectrometry uses the fragmentation of precursor ions to fragment ions within a triple quadrupole Mass specrometer (MS). The separation of compounds with different molecular weights occurs in the first quadrupole by the selection of a precursor ion. The identification is performed by the isolation of a fragment ion after collision induceddissociation of the precursor ion in the second quadrupole. Reviews of this technique can be found in Kenneth et al. (19880 *Techniques and Applications of Tandem Mass Spectrometry*, VCH Publishers, Inc. Additional details regarding the application of mass spectrometry to high-throughput analysis of shuffling products are provided in, e.g., US Patent Application "HIGH THROUGH-PUT MASS SPECTROMETRY" by Raillard et al. filed Feb. 11, 2000 (Attorney docket Number 2-295-1).

BACKCROSSING

After a desired NSME phenotype is acquired to a satisfactory extent by a selected shuffled gene or portion thereof, it is often desirable to remove mutations which are not essential or substantially important to retention of the desired phenotype ("superfluous mutations"). This is particularly desirable when the shuffled gene sequence is to be reintroduced back into a higher plant, as it is often preferred to harmonize the shufflant NSME sequence with the endogenous NSME sequence in the higher plant taxonomic species genome while retaining the desired NSME phenotype obtained from the iterative shuffling/selection process. Superfluous mutations can be removed by backcrossing, which is shuffling the selected shuffled NSME gene(s) with one or more parental NSME gene and/or naturally-occurring NSME gene(s) (or portions thereof) and selecting the resultant collection of shufflants for those species that retain the desired phenotype. The same process may be employed for other NSME genes. By employing this method, typically in two or more recursive cycles of shuffling against parental or naturally-occurring viral genome(s) (or portions thereof) and selection for retention of the desired NSME phenotype, it is possible to generate and isolate selected shufflants which incorporate substantially only those mutations necessary to confer the desired phenotype, whilst having the remainder of the genome (or portion thereof) consist of sequence which is substantially identical to the parental (or wild-type) sequence(s). As one example of backcrossing, a potato starch metabolizing enzyme gene (small or large subunit) can be shuffled and selected for the capacity to substantially function in any Angiosperm plant cells; the resultant selected shufflants can be backcrossed with one or more NSME genes of a particular plant species and selected for the capacity to retain the capacity to confer the phenotype. After several cycles of such backcrossing, the backcrossing will yield gene(s) which contain the mutations necessary for the desired phenotype, and will otherwise have a genomic sequence substantially identical to the genome(s) of the host genome.

Isolated components (e.g., genes, regulatory sequences, replication origins, and the like) can be optimized and then backcrossed with parental sequences so as to obtain optimized components which are substantially free of superfluous mutations.

The invention provides species-specific NSME shuffling, wherein a transformed plant cell or adult plant or reproductive structure comprises a polynucleotide encoding a shuffled NSME that is at least 95 percent sequence identical to the corresponding enzyme encoded by an untransformed naturally-occurring genome of the same taxonomic species of plant cell or adult plant. Typically, the shuffled NSME results from shuffling of one or more alleles encoding the NSME in the taxonomic species genome, optionally including mutagenesis in one or more of the iterative shuffling and selection cycles. The species-specific NSME shuffling may include shuffling a polynucleotide encoding a full-length NSME of a first taxonomic species under conditions whereby NSME sequences of a second taxonomic species (or collection of species) are shuffled in at a low prevalence, such that the resultant population of shufflant polynucleotides contains, on average, shuffled polynucleotides composed of at least about 95 percent sequence encoding the first taxonomic species NSME and less than about 5 percent sequence encoding the second taxonomic species (or collection of species) NSME. The species-specific shufflants are thus highly biased towards identity with the first taxonomic species and shufflants which are selected for the desired NSME phenotype are transferred back into the first taxonoic species for expression and regeneration of adult plants and germplasm. Optionally, selected shufflants are backcrossed against the naturally occurring NSME encoding sequences of the first taxonomic species to remove non-essential sequence alterations and harmonize the final shufflant sequence to the naturally-occuring NSME sequence of the first taxonomic species.

A variation of the method includes adapting a bacterial or algal NSME for optimal function in a plant cell, or adult vegetative plant. This variation comprises recursive shuffling and selection of a library of bacterial or algal NSME encoding sequences in a plant cell of the taxonomic species of plant for which the bacterial or algal NSME is being adapted to function in an adult plant. This variation can include not only selecting for a desired NSME enzymatic phenotype, but also selecting for appropriate function of a operably linked transcriptional control sequence, such as a tuber-specific (e.g., patatin promoter) or a seed-specific transcriptional control element in conjunction with NSME function. This variation can employ host cells which are regenerable post-transformation and selection of adult plants for high starch content storage tissues; recoverey of the encoding NSME shufflants (and optionally the linked transcriptional control sequences), and at least one cycle of recursive shuffling and selection to evolve a bacterial or algal NSME, and optionally a transcriptional control sequence, optimized for function in the desired plant taxonomic species or closely related taxonomic categories.

EXPRESSION OF NSME

It is frequently useful in the selection or production of the NSME of the invention to provide expression cassettes comprising: (1) a sequence encoding a shuffled starch metabolizing enzyme (e.g., a starch synthase or glycogen synthase) gene operably linked to a transcriptional regulatory sequence functional in a host cell, and further linked to (2) a selectable marker gene which affords a means of selection when expressed in host cells.

In a variation, the invention provides a polynucleotide comprising: (1) a sequence encoding a shuffled NSME gene operably linked to a transcriptional regulatory sequence functional in a bacterial host cell lacking endogenous glycogen synthesis capability resulting from a mutant gene essential for glycogen metabolism (e.g., glgA), and further linked to (2) a selectable marker gene which affords a means of selection when expressed in host cells.

In an embodiment of the method, a host cell comprising a non-photosynthetic bacterium, such as *E. coli*, lacking an endogenous NSME activity, is transformed with an expression cassette encoding the production of an NSME. NSME encoding sequences are selected by the skilled artisan from publicly available sources. The method further comprises transforming a population of complementing host cells with a library of shuffled NSME-encoding polynucleotides, each NSME shufflant polynucleotide encoding a species of a shuffled NSME, then operably linked to a transcriptional control sequence forming a expression cassette, culturing the population of transformed complementing host cells for a suitable incubation period, determining the amount of NSME activity in each transformed host cell and its clonal progeny relative to the amount of NSME in untransformed complementing host cells cultured under equivalent conditions, including culture medium, atmosphere, incubation time and temperature, and selecting from said population of transformed complementing host cells and their clonal progeny cells which exhibit NSME at statistically significant increased amount relative to said untransformed complementing host cells, and segregating or isolating said selected transformed complementing host cells thereby forming a selected subpopulation of host cells harboring selected shuffled polynucleotides encoding NSME protein species having enhanced catalytic ability; said selected shuffled polynucleotides can be recovered and optionally subjected to additional rounds of shuffling and selection for enhanced NSME catalytic or regulatory function to provide one or more optimized shuffled encoding sequences. In a variation, the transformed complementing host cells are segregated in culture vessels, such as a multimicrowell plate, wherein each vessel comprises a subpopulation of species of transformed complementing host cells and their clonal progeny, often consisting of a single species of transformed complementing host cell and its clonal progeny, if any. Typically, the expression cassettes encoding the shuffled NSME proteins are linked to a selectable marker gene cassette and selection is applied, typically by selection with an antibiotic in the culture medium, to reduce the prevalence of untransformed cells.

The invention provides a plant cell protoplast and clonal progeny thereof containing a sequence-shuffled polynucleotide encoding a NSME which is not encoded by the naturally occurring genome of the plant cell protoplast. The invention also provides a collection of plant cell protoplasts transformed with a library of sequence-shuffled NSME polynucleotides in expressible form. The invention further provides a plant cell protoplast co-transformed with at least two species of library members wherein a first species of library members comprise sequence-shuffled first species of NSME polynucleotides (e.g., an ADP glucose pyrophosphorylase) and a second species of library members comprise sequence-shuffled polynucleotides of a second species of NSME (e.g., soluble starch synthase). In an embodiment, the polynucleotides are transferred into a plastid compartment for expression and processing, such as by transfer into chloroplasts in a format suitable for expression in the plastid, such as for example and not limitation as a recombinogenic construct for general targeted recombination into a chloroplast chromosome. Alternatively, the subunit proteins encoded by the expression cassettes comprise a chloroplast or amyloplast transit peptide sequence to facilitate transfer of the encoded proteins into the plastid compartment.

TRANSCRIPTIONAL REGULATORY SEQUENCES

Suitable transcriptional regulatory sequences include: cauliflower mosaic virus 19S and 35S promoters, NOS promoter, OCS promoter, rbcS promoter, Brassica heat shock promoter, synthetic promoters, non-plant promoters modified, if necessary, for function in plant cells, substantially any promoter that naturally occurs in a plant genome, promoters of plant viruses or Ti plasmids, tissue-preferential promoters or cis-acting elements, light-responsive promoters or cis-acting elements (e.g., rbcS LRE), hormone-responsive cis-acting elements, developmental stage-specific promoters and cis-acting elements, viral promoters (e.g., from Tobacco Mosaic virus, Brome Mosaic Virus, Cauliflower Mosaic virus, and the like), and the like. In a variation, a transcriptional regulatory sequence from a first plant species is optimized for functionality in a second plant species by application of recursive sequence shuffling.

Transcriptional regulatory sequences for expression of shuffled NSME sequences in chloroplasts is known in the art (Daniell et al. (1998) op.cit; O'Neill et al. (1993) The Plant Journal 3: 729; Maliga P (1993) op.cit), as are homologous recombination vectors.

In a variation, the invention provides a polynucleotide comprising: (1) a sequence encoding a shuffled starch synthase gene operably linked to a transcriptional regulatory sequence functional in a host cell, (2) a sequence encoding a shuffled NSME gene other than starch synthase or glycogen synthase (e.g., a branching enzyme, debranching enzyme, amylase, or starch phosphorylase) operably linked to a transcriptional regulatory sequence functional in the host cell and, optionally, further linked to (3) a selectable marker gene which affords a means of selection when expressed in host cells.

The various shuffled sequence embodiments described herein can be multiplexed with each other and/or with naturally-occurring gene sequences that encode starch metabolic enzyme genes from plants, animals, yeast, algae, and bacteria. Plants, yeast, algae, and bacteria harboring expression constructs of such multiplexed starch metabolic enzyme genes can produce starches having desired physicochemical properties which are useful in a variety of commercial uses.

PLANT CELLS CONTAINING EXPRESSIBLE SHUFFLANT SEQUENCES

Transgenes and expression vectors to express shufflant NSME sequences can be constructed by any suitable method known in the art; by either PCR or RT-PCR amplification from a suitable cell type or by ligating or amplifying a set of overlapping synthetic oligonucleotides; publicly available sequence databases and the literature can be used to select the polynucleotide sequence(s) to encode the specific protein desired, including any mutations, consensus sequence, or mutation kernal desired by the practitioner. The coding sequence(s) are operably linked to a transcriptional regulatory sequence and, if desired, an origin of replication. Antisense or sense-suppression transgenes and genetic sequences can be optimized or adapted for particular host cells and organisms by the described methods.

The transgene(s) and/or expression vectors are transferred into host cells, protoplasts, pluripotent embryonic plant cells, microbes, or fungi by a suitable method, such as for example lipofection, electroporation, microinjection, biolistics, Agrobacterium tumefaciens transduction of Ti plasmid, calcium phosphate precipitation, PEG-mediated DNA uptake, electroporation, electrofusion, or other method. Stable transfectant host cells can be prepared by art-known methods, as can transgenic cell lines.

In some embodiments, the host cells of preference are plant cells. The resultant transgene and/or expression vector (s) encoding NSME protein(s) having the desired starch metabolic enzyme phenotype is transferred in expressible form into a plant cell, often a regenerable plant cell capable of regenerating an adult plant capable of asexual and/or sexual reproduction, such that progeny plants contain germline and/or somatic cells harboring the introduced selected shufflant polynucleotide in expressible form. Often, the selected shufflant polynucleotide sequence is placed under transcriptional control of starch metabolizing enzyme transcriptional regulatory sequences, such as those of the naturally-occurring starch synthase gene of the plant species that is the source of the regenerable plant cell into which the selected shufflant polynucleotide sequence is to be transferred; either in situ by homologous recombination targeting to an endogenous starch synthase gene locus, or by cloning and recombinant fusion of such transcription regulatory sequences to the coding sequence of the selected shufflant polynucleotide sequence. Adult plants and progeny derived from such transgenic regenerable plant cells express the encoded NSME and exhibit, e.g., novel starch synthase activity resulting in production of starches having an increased proportion of reactive position 2- or 6- glycosyl substituents ("increased reactivity starches"). Such increased reactivity starches are commercially desirable for their processing and fabrication properties, and advantageous crosslinkabilty properties for a variety of industrial, cosmetic, pharmaceutical, foodstuff, and other uses.

An object of the invention is the production of higher plants which express one or more NSME enzyme subunits which confer an enhanced starch conversion ratio (or net starch storage amount) to the plants. Although the invention is described principally with respect to the use of genetic sequence shuffling to generate enhanced NSME coding sequences, the invention also provides for the introduction of NSME coding sequences obtained from organisms having NSME with desirable enzymatic phenotypes into higher plants. Thus, the invention provides a method comprising the step of introducing into a higher plant (e.g., a monocot or dicot) an expression cassette encoding an NSME encoded by a genome of a bacterium or algae. Typically, at least a sequence encoding a substantially full-length bacterial or algal NSME is transferred. An aspect of the invention provides C4 land plants comprising a polynucleotide sequence encoding a bacterial or algal NSME composed in an expression cassette suitable for expression in chloroplasts or amyloplasts of the C4 land plant; optionally an expression cassette encoding an NSME operably linked to regulatory sequences for expression in the nucleus of the C4 plant additionally is transferred into the nucleus of the C4 plant. The NSME expression cassette is transferred into the chloroplasts or nucleus of a regenerable plant cell (e.g. a protoplast of a C4 plant cell) by art-known transformation methods. A C3 plant may be used in place of a C4 plant if desired. A specific embodiment comprises a regenerable protoplast of *Glycine max, Nicotiana tabacum*, or *Zea mays* (or other agricultural crop species amenable to regeneration from protoplasts) having a chloroplast or nuclear genome containing an expressible shuffled NSME gene that is obtained from a bacterium or algae, and typically is at least 90 percent up to 99 percent sequence identical to an NSME gene in the genome of said bacterium or algae, but is mutated in at least one codon as compared to the parental sequence. The invention also provides adult plants, cultivars, seeds, vegetative bodies, fruits, germplasm, and reproductive cells obtained from regeneration of such transformed protoplasts.

MULTIPLEXING

As the invention provides shufflant polynucleotides encoding proteins having one or more of a variety of starch metabolizing phenotypes (e.g., modified enzyme activities involved in starch metabolism), the invention also provides the combination of two or more types of shuffled NSME enzyme in a host cell or plant or portion thereof. In an embodiment, an expressible polynucleotide encoding a shuffled branching enzyme having catalytic activity for forming branched starches at least one logarithm unit greater than the most highly sequence identical naturally-occurring branching enzyme is multiplexed with a an expressible polynucleotide encoding a shuffled starch synthase or glycogen synthase having catalytic activity for forming starch at least one logarithm unit greater than the most highly sequence identical naturally-occurring starch synthase enzyme.

TRANSFORMATION

The transformation of plants, plant cells and protoplasts in accordance with the invention may be carried out in essentially any of the various ways known to those skilled in the art of plant molecular biology. See, in general, *Methods in Enzymology* Vol. 153 ("Recombinant DNA Part D") 1987, Wu and Grossman Eds., Academic Press, incorporated herein by reference. As used herein, the term transformation means alteration of the genotype of a host plant by the introduction of a nucleic acid sequence. The nucleic acid sequence need not necessarily originate from a different source, but it will, at some point, have been external to the cell into which it is to be introduced.

In one embodiment, the foreign nucleic acid is mechanically transferred by microinjection directly into plant cells by use of micropipettes. Alternatively, the foreign nucleic acid may be transferred into the plant cell by using polyethylene glycol. This forms a precipitation complex with the genetic material that is taken up by the cell (e.g., by incubation of protoplasts with "naked DNA" in the presence of polyethylenelycol) (Paszkowski et al., (1984) *EMBO J.* 3:2717–22; Baker et al (1985) Plant Genetics, 201–211; Li et al. (1990) Plant Molecular Biology Report 8(4)276–291].

In another embodiment of this invention, the introduced gene may be introduced into the plant cells by electroporation (Fromm et al., (1985) "Expression of Genes Transferred into Monocot and Dicot Plant Cells by Electroporation," *Proc. Natl Acad. Sci. USA* 82:5824, which is incorporated herein by reference). In this technique, plant protoplasts are electroporated in the presence of plasmids or nucleic acids containing the relevant genetic construct. Electrical impulses of high field strength reversibly permeabilize biomembranes allowing the introduction of the plasmids. Electroporated plant protoplasts reform the cell wall, divide, and form a plant callus. Selection of the transformed plant cells with the transformed gene can be accomplished using phenotypic markers.

Cauliflower mosaic virus (CaMV) may also be used as a vector for introducing the foreign nucleic acid into plant cells (Hohn et al., (1982) "Molecular Biology of Plant Tumors," Academic Press, New York, pp.549–560; Howell, U.S. Pat. No. 4,407,956). CaMV viral DNA genome is inserted into a parent bacterial plasmid creating a recombinant DNA molecule which can be propagated in bacteria. After cloning, the recombinant plasmid again may be cloned and further modified by introduction of the desired DNA sequence into the unique restriction site of the linker. The modified viral portion of the recombinant plasmid is then excised from the parent bacterial plasmid, and used to inoculate the plant cells or plants.

Another method of introduction of nucleic acid segments is high velocity ballistic penetration by small particles with the nucleic acid either within the matrix of small beads or particles, or on the surface (Klein et al., (1987) *Nature* 327:70–73). Although typically only a single introduction of a new nucleic acid segment is required, this method particularly provides for multiple introductions.

A method of introducing the nucleic acid segments into plant cells is to infect a plant cell, an explant, a meristem or a seed with *Aprobacterium tumefaciens* transformed with the segment. Under appropriate conditions known in the art, the transformed plant cells are grown to form shoots, roots, and develop further into plants. The nucleic acid segments can be introduced into appropriate plant cells, for example, by means of the Ti plasmid of *Agrobacterium tumefaciens*. The Ti plasmid is transmitted to plant cells upon infection by *Agrobacterium tumefaciens*, and is stably integrated into the plant genome (Horsch et al., (1984) "Inheritance of Functional Foreign Genes in Plants," *Science*, 233:496–498; Fraley et al., (1983) *Proc. Natl. Acad. Sci. USA* 80:4803).

Ti plasmids contain two regions essential for the production of transformed cells. One of these, named transfer DNA (T DNA), induces tumor formation. The other, termed virulent region, is essential for the introduction of the T DNA into plants. The transfer DNA region, which transfers to the plant genome, can be increased in size by the insertion of the foreign nucleic acid sequence without its transferring ability being affected. By removing the tumor-causing genes so that they no longer interfere, the modified Ti plasmid can then be used as a vector for the transfer of the gene constructs of the invention into an appropriate plant cell, such being a "disabled Ti vector."

All plant cells which can be transformed by Aprobacterium and whole plants regenerated from the transformed cells can also be transformed according to the invention so as to produce transformed whole plants which contain the transferred foreign nucleic acid sequence.

There are presently at least three different ways to transform plant cells with Agrobacterium:
(1) co-cultivation of Agrobacterium with cultured isolated protoplasts,
(2) transformation of cells or tissues with Agrobacterium, or
(3) transformation of seeds, apices or meristems with Agrobacterium.

Method (1) uses an established culture system that allows culturing protoplasts and plant regeneration from cultured protoplasts.

Method (2) uses (a) that the plant cells or tissues can be transformed by Agrobacterium and (b) that the transformed cells or tissues can be induced to regenerate into whole plants.

Method (3) uses micropropagation. In the binary system, to have infection, two plasmids are needed: a T-DNA containing plasmid and a vir plasmid. Any one or more of a number of T-DNA containing plasmids can be used, generally provided that the plasmids can be selected independently.

After transformation of the plant cell or plant, those plant cells or plants transformed by the Ti plasmid so that the desired DNA segment is integrated can be selected by an appropriate phenotypic marker. These phenotypic markers include, but are not limited to, antibiotic resistance, herbicide resistance or visual observation. Other phenotypic markers are known in the art and may be used in this invention.

PROTOPLAST TRANSFORMATION

Numerous protocols for establishment of transformable protoplasts from a variety of plant types and subsequent transformation of the cultured protoplasts are available int he art and are incorporated herein by general reference. For examples, see Hashimoto et al. (1990) *Plant Physiol.* 93: 857; *Plant Protoplasts*, Fowke LC and Constabel F, eds., CRC Press (1994); Saunders et al. (1993) Applications of Plant In Vitro Technology Symposium, UPM, Nov. 16–18 1993; and Lyznik et al. (1991) *BioTechniques* 10: 295, each of which is incorporated herein by reference).

All plants from which protoplasts can be isolated and cultured to give whole regenerated plants can be transformed by the present invention so that whole plants are recovered which contain the transferred foreign gene. Some suitable plants include, for example, species from the genera Fragaria, Lotus, Medicavo, Onobrvchis, Trifolium, Trizonella, Vigna, Citrus, Linum, Geranium, Manihot, Daucus, Arabidopsis, Brassica, Raphanus, Sinapis, Atropa, Capsicum, Hyoscyamus, Lycopersicon, Nicotiana, Solanum, Petunia, Digitalis, Majorana, Ciohorium, Helianthus, Lactuca, Bromus, Asparagus, Antirrhinum, Hererocallis, Nemesia, Pelargonium, Panicum, Pennisetum, Ranunculus, Senecio, Salpiplossis, Cucumis, Browaalia, Glycine, Lolium, Zea, Triticum, Sorghum, and Datura.

It is known that practically all plants can be regenerated from cultured cells or tissues, including but not limited to all major cereal crop species, sugarcane, sugar beet, cotton, fruit and other trees, legumes and vegetables. Limited knowledge presently exists on whether all of these plants can be transformed by Agrobacterium. Species which are a natural plant host for Agrobacterium may be transformable in vitro. Although monocotyledonous plants, and in particular, cereals and grasses, are not natural hosts to Agrobacterium, work to transform them using Agrobacterium has also been successfully carried out by numerous investigators (Hooykas-Van Slogteren et al., (1984) *Nature* 311:763–764; Hemalsteens et al., (1984) EMBO J. 3:3039–41; Byteiber, et al. (1987) *Proc. Natl. Acad. Sci. USA*: 5345–5349; Graves and Goldman, (1986) Plant Mol. Biol 7: 43–50; Grimsley et al. (1988) Biochemistry 6: 185–189; WO 86/03776; Shimamoto et al. Nature (1989) 338: 274–276). Monocots may also be transformed by techniques or with vectors other than Agrobacterium. For example, monocots have been transformed by electroporation (Fromm et al. [1986] Nature 319:791–793; Rhodes et al. Science [1988] 240: 204–207), direct gene transfer (Baker et al. [1985] Plant Genetics 201–211), by pollen-mediated vectors (EP 0 270 356), and by injection of DNA into floral tillers (de la Pena et al. [1987], Nature 325:274–276). Additional plant genera that may be transformed by Agrobacterium include Chrysanthemum, Dianthus, Gerbera, Euphorbia, Pelaronium, Ipomoca, Passiflora, Cyclamen, Malus, Prunus, Rosa, Rubus, Populus, Santalum, Allium, Lilium, Narcissus, Ananas, Arachis, Phaseolus and Pisum.

CHLOROPLAST TRANSFORMATION

When the NSME enzyme of higher plants is encoded in the nuclear genome and expressed with a fused chloroplast transit sequence peptide (CTS) to facilitate transloaction of the NSMEs into chloroplasts, it can be advantageous to transform the shufflant NSME encoding sequences into chloroplasts if the host cells are derived from higher plants. Numerous methods are available in the art to accomplish the chloroplast transformation and expression (Daniell et al. (1998) op.cit; O'Neill et al. (1993) *The Plant Journal* 3: 729; Maliga P (1993) op cit). The expression construct comprises a transcriptional regulatory sequence functional in plants operably linked to a polynucleotide encoding an enhanced NSME protein subunit. With respect to polynucleotide sequences encoding NSME proteins, it is desirable to express such encoding sequences in plastids, such as chloroplasts, for appropriate transcription, translation, and processing. With reference to expression cassettes which are designed to function in chloroplasts, such as an expression cassette encoding a subunit of NSME in a higher plant, the expression cassette comprises the sequences necessary to ensure expression in chloroplasts or amyloplasts typically the subunit encoding sequence is flanked by two regions of homology to the plastid genome so as to effect a homologous recombination with the chloroplastid genome; often a selectable marker gene is also present within the flanking plastid DNA sequences to facilitate selection of genetically stable transformed chloroplasts in the resultant transplastonic plant cells (see Maliga P (1993) TIBTECHI 11: 101; Daniell et al. (1998) *Nature Biotechnology* 16: 346, and references cited therein).

TARGET PLANTS

As used herein, "plant" refers to either a whole plant, a plant part, a plant cell, or a group of plant cells. The class of plants which can be used in the method of the invention is generally as broad as the class of higher plants amenable to protoplast transformation techniques, including both monocotyledonous and dicotyledonous plants. It includes plants of a variety of ploidy levels, including polyploid, diploid and haploid, and may employ non-regenerable cells for certain aspects which do not require development of an adult plant for selection or in vivo shuffling.

REGENERATION

Normally, regeneration will be involved in obtaining a whole plant from the transformation process. The term "transgenote" refers to the immediate product of the transformation process and to resultant whole transgenic plants.

The term "regeneration" as used herein, means growing a whole plant from a plant cell, a group of plant cells, a plant part or a plant piece (e.g. from a protoplast, callus, or tissue part).

Plant regeneration from cultural protoplasts is described in Evans et al., "Protoplasts Isolation and Culture," *Handbook of Plant Cell Cultures* 1: 124–176 (MacMillan Publishing Co. New York 1983); M. R. Davey, "Recent Developments in the Culture and Regeneration of Plant Protoplasts," *Protoplasts*, (1983)—Lecture Proceedings, pp.12–29, (Birkhauser, Basal 1983); P. J. Dale, "Protoplast Culture and Plant Regeneration of Cereals and Other Recalcitrant Crops," *Protoplasts* (1983)—Lecture Proceedings, pp. 31–41, (Birkhauser, Basel 1983); and H. Binding, "Regeneration of Plants," *Plant Protoplasts*, pp.21–73, (CRC Press, Boca Raton 1985).

Regeneration from protoplasts varies from species to species of plants, but generally a suspension of transformed protoplasts containing copies of the exogenous sequence is first made. In certain species embryo formation can then be induced from the protoplast suspension, to the stage of ripening and germination as natural embryos. The culture media will generally contain various amino acids and hormones, such as auxin and cytokinins. It is sometimes advantageous to add glutamic acid and proline to the medium, especially for such species as corn and alfalfa. Shoots and roots normally develop simultaneously. Efficient regeneration will depend on the medium, on the genotype, and on the history of the culture. If these three variables are controlled, then regeneration is fully reproducible and repeatable.

Regeneration also occurs from plant callus, explants, organs or parts. Transformation can be performed in the context of organ or plant part regeneration. See, *Methods in Enzymology, supra*; also *Methods in Enzymology*, Vol. 118; and Klee et al., (1987) *Annual Review of Plant Physiology*, 38:467–486.

In vegetatively propagated crops, the mature transgenic plants are propagated by the taking of cuttings or by tissue culture techniques to produce multiple identical plants for trialling, such as testing for production characteristics. Selection of desirable transgenotes is made and new varieties are obtained thereby, and propagated vegetatively for commercial sale.

In seed propagated crops, the mature transgenic plants are self crossed to produce a homozygous inbred plant. The inbred plant produces seed containing the gene for the newly introduced foreign gene activity level. These seeds can be grown to produce plants that would produce the selected phenotype.

The inbreds according to this invention can be used to develop new hybrids. In this method a selected inbred line is crossed with another inbred line to produce the hybrid. The offspring resulting from the first experimental crossing of two parents is known in the art as the F1 hybrid, or first filial generation. Of the two parents crossed to produce F1 progeny according to the present invention, one or both parents can be transgenic plants.

Parts obtained from the regenerated plant, such as flowers, seeds, leaves, branches, fruit, and the like are covered by the invention, provided that these parts comprise cells which have been so transformed. Progeny and variants, and mutants of the regenerated plants are also included within the scope of this invention, provided that these parts comprise the introduced DNA sequences. Progeny and variants, and mutants of the regenerated plants are also included within the scope of this invention.

EXPERIMENTAL EXAMPLES

The following examples are given to illustrate the invention, but are not to be limiting thereof.

EXAMPLE 1

Shuffling ADP-Glucose Pyrophosphorylase

Genes coding for ADP-glucose pyrophosphorylase (NSME) from *E. coli* are isolated using primers designed from published sequence in the Genbank. Total genomic DNA, or alternatively, a genomic DNA library of *E. coli* is used as a source for the NSME gene. Similarly, NSME genes from other microorganisms are isolated including from cyanobacteria. All of these prokaryotes have a single subunit NSME (Preiss J, (1996) *Biotechnology Annual Review* Vol. 2, pp259–279).

The NSME genes from various microorganisms, which have at least 70 percent nucleotide sequence identity are shuffled according to published procedures. Briefly, this procedure involves random fragmentation of the genes with DNAse I and selecting nucleotide fragments of 100–300 bp. The fragments are reassembled based on sequence similarity by primerless PCR. Recombination as well as variable levels of mutations that are introduced by the PCR reaction generate the diversity. The assembled genes is cloned into a starch minus *E. coli* mutant that lacks NSME such as LCB618 (available at the Coli Genetics Stock Center at Yale). Transformed colonies expressing a functional NSME are screened for production of glycogen by iodine staining (Greene TW et al. (1996) *PNAS* 93: 1509–1513). Those colonies staining dark blue (greater starch content) are presumed to contain deregulated NSME. Colonies expressing shuffled NSME genes are selected and grown in larger amounts in liquid culture and assayed for specific properties (Meyer et al. (1998) *Archives Biochem. Biophys.* Pp152–159) relative to the wildtype enzyme, such as: (a) insensitivity to activation by fructose-I, 6-bisphosphate (FBP) (b) desensitized to inhibition by AMP and inorganic phosphate (c) decreased Km for the two substrates, glucose-I-phosphate and ATP (d) increased Vmax. Genes from those clones expressing one or more of the desired properties mentioned above are iteratively shuffled in order to achieve optimization of one or more of the properties mentioned above. The optimized gene, after appropriate modification, is used to transform the desired crop species in order to deregulate and increase starch biosynthesis in various tissues including tubers and seeds.

Plant genes coding for NSME are cloned into *E. coli* (Iglesias A et al. *J. Biol Chem* 268: 1081–1086) and shuffled as described above, to optimize the desired properties. The plant enzyme is composed of two subunits, the small catalytic and the large regulatory subunit. Both genes are shuffled individually or in combination. Selection is done in *E. coli* as described above. Enzyme assays can be performed for analysis of properties as described in literature (Meyer et al. (1998) *Archives Biochem. Biophys.* Pp152–159). A difference between the plant and bacterial enzyme is that the activator is 3-phosphoglycerate and the inhibitor is inorganic phosphate.

EXAMPLE 2

Mass Spectroscopy to Assay Starch Composition

Introduction: The formation of a tetramer oligosaccharide as a product of a shuffled galactosyl transferase enzyme was monitored using high throughput mass spectroscopy.

MS/MS Analysis. Stachyose, a commercially available oligosaccharide was used as an internal standard to monitor the reproducibility of the instrument and of the sample preparation prior to MS analysis. Standard solutions (1 mM) of the substrate, the product and Stachyose were prepared in MeOH and injected into the triple quadrupole mass spectrometer to establish tandem mass spectroscopy (MS/MS) methods. The oligosaccharides were detected as sodium adducts $M+Na^+$.

CELL GROWTH AND PROTEIN EXPRESSION

The shuffled galactosyl transferase genes were expressed in *E. coli* under the control of an inducible lac promoter. Cells were grown from a single colony overnight at 37° C. in LB containing Kanamycin as antibiotic marker and 2% glucose until they reached stationary phase. Cell growth in presence of 2% glucose resulted in complete suppression of expression. The saturated cell cultures were ten-fold diluted into fresh LB+Kanamycin without glucose. This reduction in glucose concentration was sufficient to initiate protein expression. Expression occurred at 37° C. for six hours. All cell growth was performed in 96-well sterile microtiter plates.

Figure 2:
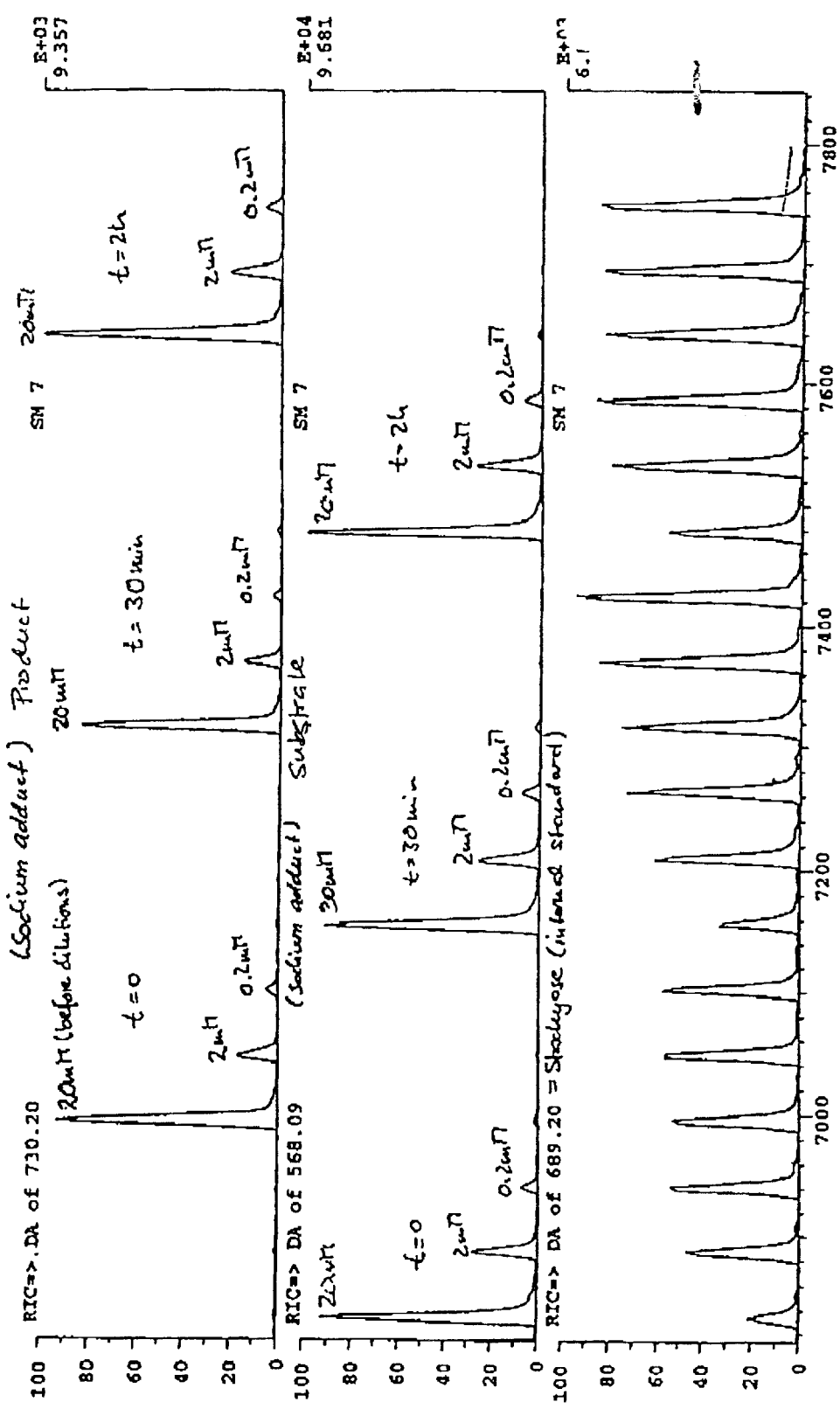
FIG. 2 shows the titration of different starch sample concentrations of samples injected into the triple quadrupole mass spectroscope and analyzed using tandem mass spectroscopy.
Figure 3:
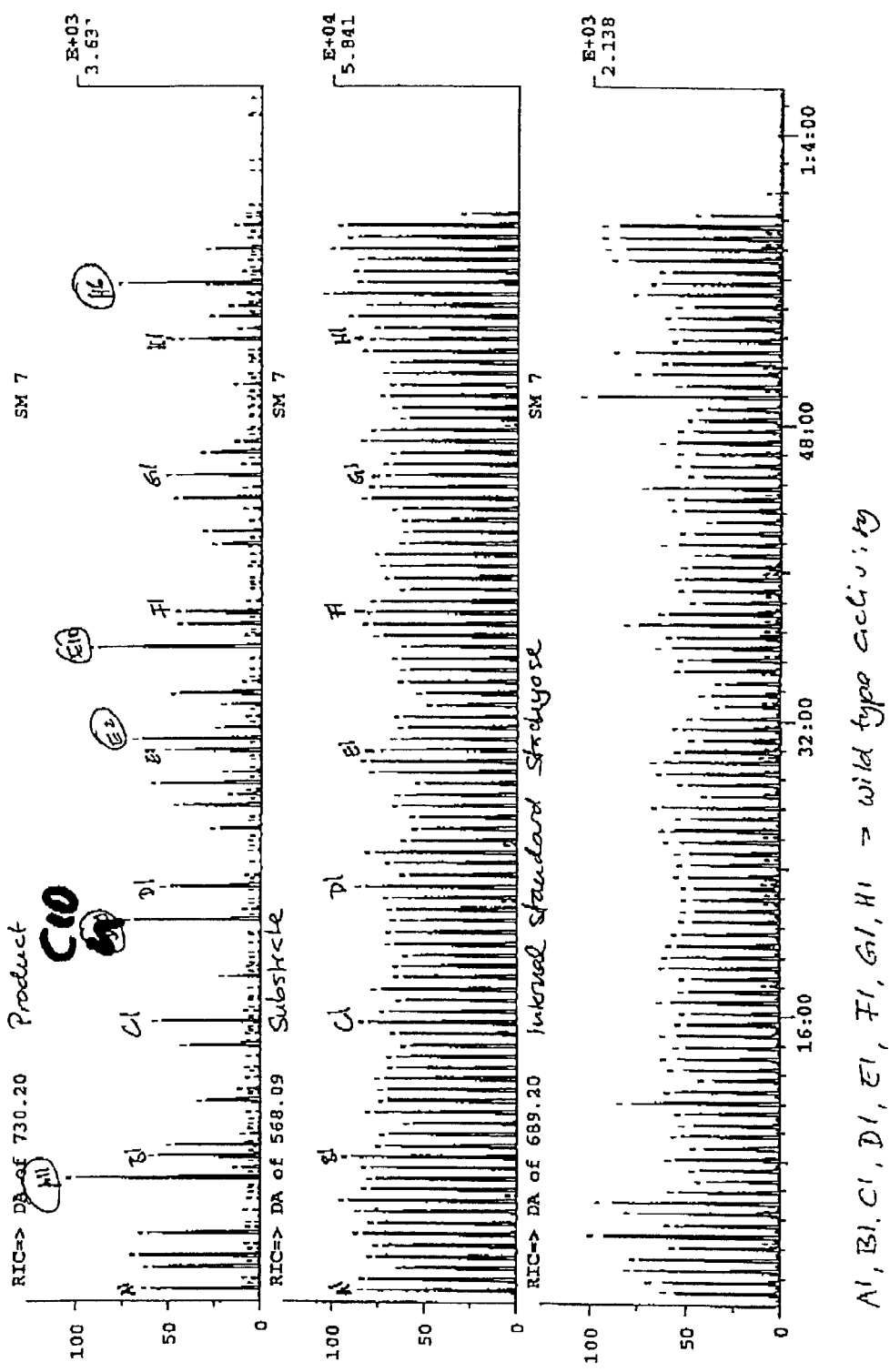
FIG. 3 shows a typical sample run of a starch sample from one well of a microtitre plate containing an oligosaccharide synthesized using shuffled galactosyl transferase in vitro.

A reaction buffer containing 20 mM substrate and 20 mM UDP-Gal in 50 mM ammonium citrate (pH 7.0), 5 mM manganese chloride and 2 mg/mL polymyxine B sulfate was prepared freshly from stock solutions and distributed into 96-well microtiter plates. Cells (1 to 10 $\mu$L) were added to a final concentration of 25 $\mu$L to 100 $\mu$L and reacted for various lengths of time. The reaction was quenched by a solution containing 25 mM EDTA and 300 $\mu$M stachyose. Polymyxine is a cell permeabilizing agent that allows free passage of the substrate and product through *E. coli* cell walls. Manganese is necessary for enzyme activity of galactosyl transferase. Thus, the reaction time could be controlled by quenching with EDTA. The reaction solutions were transferred into a 96-well filter plate containing mixed ion exchange resin (100 $\mu$L by volume). Ethanol was added to a total concentration of 90% and the solution shaken at RT for 5 minutes. The purified solution was separated from the ion exchange resin and all solid debris by centrifugation or filtration in vacuo. The solutions were directly injected into the triple quadruple MS using flow-injection technique and samples analyzed using tandem mass spectroscopy. Typical sample injection time varied between 30 sec. and 40 sec. The results are shown in FIGS. 1 and 2.

The foregoing description of the preferred embodiments of the present invention has been presented for purposes of illustration and description. They are not intended to be exhaustive or to limit the invention to the precise form disclosed, and many modifications and variations are possible in light of the above teaching. Such modifications and variations which may be apparent to a person skilled in the art are intended to be within the scope of this invention.

All publications, patents and patent applications herein are incorporated by reference to the same extent as if each individual publication, patent or patent application was specifically and individually indicated to be incorporated by reference for all purposes. The references discussed herein are provided solely for their disclosure prior to the filing date of the present application. Nothing herein is to be construed as an admission that the inventors are not entitled to antedate such disclosure by virtue of prior invention.

What is claimed is:

1. A method of making a novel starch metabolizing enzyme (NSME) with a modified substrate usage compared to a parental starch metabolizing enzyme, the method comprising:
   (i) recombining a plurality of polynucleotide fragments in vitro to produce a library of recombinant polynucleotides, the polynucleotide fragments comprising at least one polynucleotide encoding a parental starch metabolizing enzyme selected from the group consisting of a starch synthase and a branching enzyme;
   (ii) optionally repeating step (i) one or more times;
   (iii) introducing the library of recombinant polynucleotides into a plurality of host cells, thereby producing a library of host cells comprising recombinant polynucleotides; and
   (iv) identifying at least one host cell with modified substrate usage confined by a recombinant polynucleotide encoding an NSME compared to a host cell comprising a polynucleotide encoding the parental starch metabolizing enzyme, thereby identifying at least one recombinant polynucleotide encoding an NSME with a modified substrate usage.

2. The method of claim 1, further comprising repeating steps (i) through (iv) at least one additional time, wherein the plurality of DNA fragments in step (i) comprise at least one previously identified recombinant polynucleotide encoding an NSME with a modified substrate usage.

3. The method of claim 1, wherein the parental starch metabolizing enzyme comprises a plant, microbial, yeast or animal starch metabolizing enzyme.

4. The method of claim 1, wherein the plurality of polynucleotide fragments comprise a plurality of genes encoding starch metabolizing enzymes, which genes encoding starch metabolizing enzymes are at least about 70% identical.

5. The method of claim 1, wherein the plurality of polynucleotide fragments comprise a plurality of genes encoding starch metabolizing enzymes, which starch metabolizing enzymes differ by at least one amino acid position.

6. The method of claim 1, wherein providing the plurality of polynucleotide fragments comprises providing at least one sequence in a computer, and synthesizing one or more synthetic polynucleotide corresponding to the sequence.

7. The method of claim 1, wherein the plurality of polynucleotide fragments comprises at least one single stranded nucleic acid template, and a plurality of nucleic acid fragments that hybridizes to the at least one single stranded nucleic acid template.

8. The method of claim 1, comprising recombining the plurality of polynucleotide fragments in vitro.

9. The method of claim 1, comprising identifying the at least one host cell with an enhanced metabolic phenotype by assaying individual or pooled host cells for NSME catalytic activity to determine a relative or absolute catalytic activity conferred by the recombinant polynucleotide encoding an NSME.

10. The method of claim 9, comprising assaying individual or pooled host cells to determine a relative or absolute Km for a substrate, Km for an activator, Km for an inhibitor, or Vmax.

11. The method of claim 9, comprising assaying a sample purified from the host cell by tandem mass spectroscopic analysis on a triple quadrupole mass spectrometer, thereby detecting the composition of each starch sample.

12. The method of claim 1, comprising identifying at least one host cell with modified substrate usage by assaying samples of host cells, which host cells are isolated into discrete reaction vessels or assayed in situ.

13. The method of claim 1, wherein the plurality of host cells comprise bacterial cells, which bacterial cells are deficient for at least one endogenous starch metabolizing enzyme.

14. The method of claim 13, wherein the bacterial cells are deficient for one or more of a phosphoglucomutase, a glucose pyrophosphorylase, a starch synthase, a starch synthase or a beta-N-acetylglucosaminidase.

15. The method of claim 13, wherein the bacterial cells comprise *E. coli* cells.

16. The method of claim 13, comprising identifying at least one host cell with modified substrate usage by selecting for complementation conferred by a recombinant polynucleotide encoding an NSME with modified substrate usage.

17. The method of claim 1, wherein the modified substrate usage results in increased starch formation ratio, increased starch formation rate, increased accumulation of a starch, decreased accumulation of a starch, or production of a novel starch composition.

18. The method of claim 1, wherein the host cell comprises a plant cell or a photosynthetic microbial cell.

19. The method of claim 1, further comprising recovering the at least one recombinant polynucleotide encoding an NSME with modified substrate usage.

20. The method of claim 19, further comprising introducing the at least one recovered recombinant polynucleotide into at least one recipient cell, to produce a transgenic cell.

21. A transgenic cell produced by the method of claim 20.

22. The transgenic cell of claim 21, which cell is a bacterial cell, an algal cell, or a photosynthetic microbial cell.

23. The method of claim 20, wherein the recipient cell is a plant cell or a photosynthetic microbial cell.

24. The method of claim 23, further comprising regenerating at least one transgenic plant cell to produce a transgenic plant.

25. A polynucleotide encoding a NSME of claim 1.

26. An expression cassette comprising the polynucleotide encoding a NSME of claim 25, operably linked to a transcription regulatory sequence functional in a host cell.

27. The expression cassette of claim 26, wherein the transcription regulatory sequence is functional in bacterial cell, a photosynthetic microbial cell, or a plant cell.

28. The expression cassette of claim 27, further comprising a polynucleotide encoding a selectable marker.

29. An expression cassette comprising a polynucleotide encoding a fusion polypeptide comprising a NSME encoded by the polynucleotide of claim 25, operably linked to a plastid transit peptide, the polynucleotide operably linked to a transcription regulatory sequence, which transcription regulatory sequence results in expression of the operably linked fusion polypeptide in a plant cell, tissue or organ.

30. The expression cassette of claim 29, wherein the transcription regulatory sequence comprises a starch synthase transcriptional control sequence.

31. The expression cassette of claim 29, wherein the fusion polypeptide is expressed in a starch-storing tissue or organ of an adult plant.

32. The expression cassette of claim 29, further comprising a polynucleotide encoding a selectable marker operably linked to a transcription regulatory sequence functional in the plant cell, tissue or organ.

33. A library of recombinant polynucleotides produced by the method of claim 1.

34. A library of host cells comprising recombinant polynucleotides of claim 1.

35. The library of claim 34, the host cells comprising recombinant polynucleotides in expressible form.

36. The library of host cells of claim 34, wherein the host cells comprise bacterial cells, algal cells, fungal cells, plant cells or plant protoplasts.

37. The method of claim 1, wherein the modified substrate usage comprises modified usage of a derivitized glucose substrate.

38. The method of claim 37, wherein the derivitized glucose substrate is selected from the group consisting of ADP-glucose-6-amine, ADP-glucose-6-aldehyde, ADP-glucose-6-carboxylic acid, UDP-glucose-6-amine, alternative NDP-glucose molecules comprising position 6 reactive substituents, and ADP-, UDP- and NDP-glucose molecules comprising position 2 reactive substituents.

39. The method of claim 37, wherein the modified substrate usage comprises a lowered Km or increased Vmax for the derivitized glucose substrate compared to the parental starch metabolizng enzyme.

40. The method of claim 1, wherein the recombinant polynucleotide encodes an NSME that has at least a one-half lower Km for the derivitized glucose substrate compared to a parental starch metabolizing enzyme.

41. The method of claim 1, wherein the modified substrate usage comprises a higher Vmax for the derivitized glucose substrate.

42. The method of claim 37, wherein the Vmax of the NSME is at least a one half logarithm unit higher than the Vmax of the parental starch metabolizing enzyme.

43. The method of claim 1, wherein the host cell is a plant cell.

44. The method of claim 1, wherein the parental starch metabolizing enzyme is starch synthase.

45. The method of claim 44, wherein the starch synthase is selected from Table 1.

46. The method of claim 1, wherein the parental starch metabolizing enzyme is a branching enzyme.

47. The method of claim 44, wherein the branching enzyme is selected from Table 1.

48. A method of making a novel starch metabolizing enzyme (NSME) with a modified enzyme activity compared to a parental starch metabolizing enzyme, the method comprising:

(i) recombining a plurality of polynucleotide fragments in vitro to produce a library of recombinant polynucleotides, the polynucleotide fragments comprising at least one polynucleotide encoding a parental starch metabolizing enzyme selected from the group consisting of a starch adsynthase and a branching enzyme;

(ii) optionally repeating step (i) one or more times;

(iii) introducing the library of recombinant polynucleotides into a plurality of plant cells, thereby producing a library of host cells comprising recombinant polynucleotides; and (iv) identifying at least plant cell with a modified enzyme activity conferred by a recombinant polynucleotide encoding an NShfE compared to a plant cell comprising a polynucleotide encoding the parental starch metabolizing enzyme, thereby identifying at least one recombinant polynucleotide encoding an NSME with a modified enzyme activity.

49. The method of claim 48, further comprising repeating steps (i) through (iv) at least one additional time, wherein the plurality of DNA fragments in step (i) comprise at least one previously identified recombinant polynucleotide encoding an NSME with a modified enzyme activity.

50. The method of claim 48, wherein the parental starch metabolizing enzyme comprises a plant, microbial, yeast or animal starch metabolizing enzyme.

51. The method of claim 48, wherein the plurality of polynucleotide fragments comprise a plurality of genes encoding starch metabolizing enzymes, which genes encoding starch metabolizing enzymes are at least about 70% identical.

52. The method of claim 48, wherein the plurality of polynucleotide fragments comprises at least one single stranded nucleic acid template, and a plurality of nucleic acid fragments that hybridizes to the at least one single stranded nucleic acid template.

53. The method of claim 48, comprising identifying the at least one host cell with an enhanced metabolic phenotype by assaying individual or pooled host cells for NSME catalytic activity to determine a relative or absolute catalytic activity conferred by the recombinant polynucleotide encoding an NSME.

54. The method of claim 53, comprising assaying individual or pooled host cells to determine a relative or absolute Km for a substrate, Km for an activator, Km for an inhibitor, or Vmax.

55. The method of claim 48, comprising assaying a sample purified form the plant cell by tandem mass spectroscopic analysis on a triple quadrupole mass spectrometer, thereby detecting the composition of each starch sample.

56. The method of claim 48, comprising identifying at least one host cell with modified substrate usage by assaying samples of plant cells, which plant cells are isolated into discrete reaction vessels or assayed in situ.

57. The method of claim 48, wherein the plant cells are deficient for at least one endogenous starch metabolizing enzyme.

58. The method of claim 48, wherein the modified enzyme activity comprises increased starch formation ratio, increased starch formation rate, increased accumulation of a starch, decreased accumulation of a starch, or production of a novel starch composition.

59. The method of claim 48, further comprising recovering the at least one recombinant polynucleotide encoding an NSME with modified enzyme activity.

60. The method of claim 48, further comprising regenerating at least one transgenic plant cell to produce a transgenic plant.

61. A polynucleotide encoding a NSME of claim 48.

62. An expression cassette comprising the polynucleotide encoding a NSME of claim 61, operably linked to a transcription regulatory sequence functional in a host cell.

63. The expression cassette of claim 62, further comprising a polynucleotide encoding a selectable marker.

64. An expression cassette comprising a polynucleotide encoding a fusion polypeptide comprising a NSME encoded by the polynucleotide of claim 60, operably linked to a plastid transit peptide, the polynucleotide operably linked to a transcription regulatory sequence, which transcription regulatory sequence results in expression of the operably linked fusion polypeptide in a plant cell, tissue or organ.

65. A library of recombinant polynucleotides produced by the method of claim 48.

66. A library of plant cells comprising recombinant polynucleotides of claim 48.

67. The library of claim 66, the plant cells comprising recombinant polynucleotides in expressible form.

68. The method of claim 1, comprising recombining a plurality of sequences corresponding to the polynucleotide fragments in silico.

69. The method of claim 16, comprising selecting for complementation by exposing a sample of individual or pooled host cells to iodine vapor, determining the relative or absolute amount of starch in each sample of host cells, and comparing the amount of starch to the amount of starch in a sample of untransformed host cells.

70. A transgenic plant produced by the method of claim 31.

71. The transgenic plant of claim 70, further comprising at least one additional polynucleotide encoding a starch metabolizing enzyme.

72. The transgenic plant of claim 71, wherein the at least one additional polynucleotide encodes a bacterial, plant, algal or fungal starch metabolizing enzyme.

73. A composition comprising a harvested starch organ of the transgenic plant of claim 70.

74. A fusion polypeptide comprising a NSME encoded by the polynucleotide of claim 25, operably linked to a plastid transit peptide.

75. The composition of claim 1, wherein the NSME is expressed in a transgenic cell or organism.

76. The composition of claim 75, wherein the transgenic cell or organism is a plant cell or photosynthetic microbe.

77. The composition of claim 76, which starch differs from a naturally occuring starch produced by the same species by one or more property selected from: glucosamine content, mean main chain length, size distribution, degree and mean length of branching, melting point, refraction index, tensile strength, viscosity, swelling volume, fractional lipid content, gelation, solubility, crosslinking potential, phosphate content, and incorporation of one or more desirable chemical moiety.

78. The method of claim 77, wherein the one or more chemical moiety is selected from among: an amine group, an aldehyde group, a phosphate group, and a carboxylic acid group.

79. The method of claim 78, wherein the incorporation of a chemical moiety occurs at a carbon in the 6 or 2 position of a sugar ring.

80. A transgenic plant cell produced by the method of claim 48.

81. A novel starch metabolizing enzyme produced by the method of claim 1.

82. A composition comprising a starch produced by the catalytic activity of an NSME produced by claim 1.

* * * * *

UNITED STATES PATENT AND TRADEMARK OFFICE
CERTIFICATE OF CORRECTION

PATENT NO. : 6,703,240 B1 Page 1 of 1
DATED : March 9, 2004
INVENTOR(S) : Stemmer et al.

It is certified that error appears in the above-identified patent and that said Letters Patent is hereby corrected as shown below:

<u>Title Page,</u>
Item [73], Assignee, please delete "Maxygar" and insert -- Maxygen --.

Signed and Sealed this

First Day of June, 2004

JON W. DUDAS
*Acting Director of the United States Patent and Trademark Office*